(12) United States Patent
Aoki et al.

(10) Patent No.: US 8,774,796 B2
(45) Date of Patent: Jul. 8, 2014

(54) SYSTEM USING INTERNATIONAL ROAMING-CAPABLE MOBILE COMMUNICATION NETWORK

(75) Inventors: Tomonori Aoki, Minato-ku (JP); Masayuki Doi, Minato-ku (JP); Yusuke Murai, Minato-ku (JP); Tadahisa Iritani, Minato-ku (JP); Eiichi Kataoka, Minato-ku (JP)

(73) Assignee: Vodafone Group PLC, Newbury, Berkshire (GB)

( * ) Notice: Subject to any disclaimer, the term of this patent is extended or adjusted under 35 U.S.C. 154(b) by 1380 days.

(21) Appl. No.: 10/572,223

(22) PCT Filed: Sep. 17, 2004

(86) PCT No.: PCT/JP2004/013616
§ 371 (c)(1),
(2), (4) Date: Jun. 3, 2007

(87) PCT Pub. No.: WO2005/029886
PCT Pub. Date: Mar. 31, 2005

(65) Prior Publication Data
US 2009/0011758 A1 Jan. 8, 2009

(30) Foreign Application Priority Data

Sep. 19, 2003 (JP) .................. 2003-327385
Sep. 19, 2003 (JP) .................. 2003-327386

(51) Int. Cl.
*H04W 4/00* (2009.01)
*H04W 64/00* (2009.01)
*H04W 4/02* (2009.01)
*H04L 29/08* (2006.01)
*H04L 29/06* (2006.01)
*H04W 4/18* (2009.01)

(52) U.S. Cl.
CPC .................. *H04W 4/02* (2013.01); *H04L 67/02* (2013.01); *H04L 67/18* (2013.01); *H04W 64/00* (2013.01); *H04L 69/22* (2013.01); *H04W 4/185* (2013.01); *H04L 67/2804* (2013.01)
USPC ........ 455/432.1; 455/433; 455/436; 455/437; 455/439; 455/442; 370/328; 370/331

(58) Field of Classification Search
USPC ............. 455/432.1, 432.3, 433, 435.1, 435.2, 455/435.3, 436, 437, 439, 442, 417; 370/328, 331, 332, 338
See application file for complete search history.

(56) References Cited

U.S. PATENT DOCUMENTS

| | | | |
|---|---|---|---|
| 5,594,947 A * | 1/1997 | Grube et al. .................. 455/509 |
| 6,256,498 B1 | 7/2001 | Ludwig | |
| 6,741,868 B1 * | 5/2004 | Park et al. .................. 455/552.1 |
| 6,782,274 B1 * | 8/2004 | Park et al. .................. 455/552.1 |
| 7,047,008 B2 * | 5/2006 | Martlew ..................... 455/432.1 |
| 7,277,416 B1 * | 10/2007 | Chang et al. .................. 370/338 |
| 2001/0014606 A1 * | 8/2001 | Kim .............................. 455/432 |
| 2002/0006787 A1 * | 1/2002 | Darby ........................... 455/419 |
| 2002/0022474 A1 * | 2/2002 | Blom et al. .................. 455/410 |
| 2002/0034960 A1 * | 3/2002 | Muranaga ..................... 455/517 |
| 2003/0073428 A1 | 4/2003 | Yamamoto | |
| 2004/0203750 A1 * | 10/2004 | Cowdrey et al. ........... 455/432.1 |

FOREIGN PATENT DOCUMENTS

| | | |
|---|---|---|
| DE | 19730363 A1 | 1/1999 |
| EP | 1119211 A2 | 7/2001 |
| EP | 1443792 A1 | 8/2004 |
| JP | 2000-138969 | 5/2000 |
| JP | 2001-119750 | 4/2001 |
| JP | 2004-236182 | 8/2004 |
| WO | WO0156214 A2 | 8/2001 |
| WO | WO 01/91411 A1 | 11/2001 |
| WO | WO0191411 A1 | 11/2001 |
| WO | WO 02073907 * | 9/2002 |
| WO | WO03/039187 A1 | 5/2003 |

OTHER PUBLICATIONS

3PGG TS 25.331 V3.15.0 (Jun. 2003), 3rd Generation Partnership Project; Technical Specification Group Radio Access Network; Radio Resource Control (RRC) protocol specification (Release 1999), pp. 1-50.

Vancouver Webpages: "Geographic extensions for HTTP transactions; draft-daviel-http-geo-header-04.txt", IETF Standard-Working-Draft, Internet Engineering Task Force, IETF, CH, No. 4, Jul. 1, 2003, XP015012246, ISSN: 0000-0004.

* cited by examiner

*Primary Examiner* — Shahriar Behnamian
(74) *Attorney, Agent, or Firm* — Muirhead and Saturnelli, LLC

(57) ABSTRACT

The present invention provides a system using an international roaming-capable mobile communication network in which a server controls the form in which a service is provided in accordance with the country of a service area in which a mobile station is located. The mobile station 1 determines the service area in which the mobile station 1 is located in accordance with a mobile communication mode set by a mobile communication mode setting function. Alternatively, the mobile station 1 determines the service area in which it is located through notification information relating to a mobile communication network system, received from a base station. When the mobile station 1 transmits a request for a service to a content provider server 4, the mobile station 1 simultaneously adds a region header describing the determined service area. A gateway G/W 63 may add the region header instead of the mobile station 1.

20 Claims, 12 Drawing Sheets

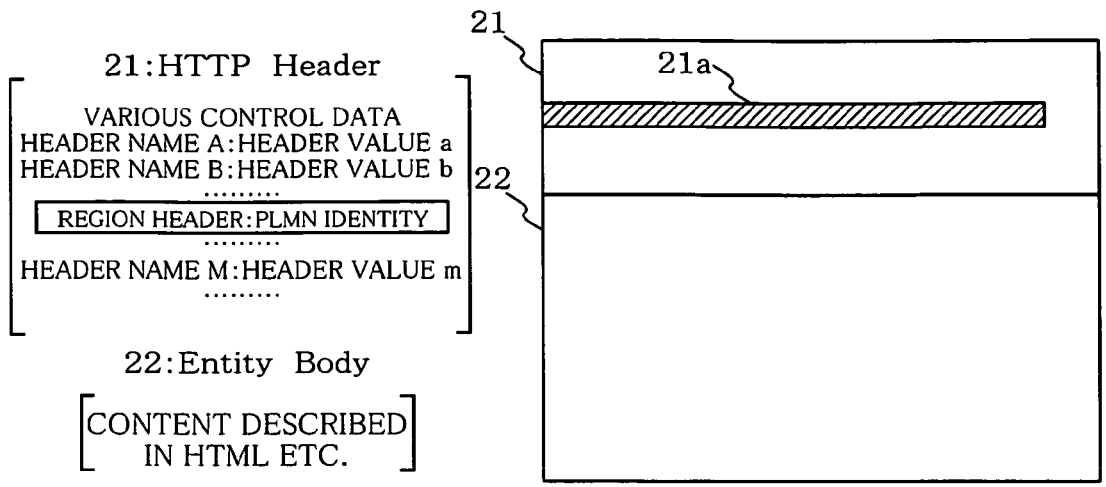

21:HTTP Header

VARIOUS CONTROL DATA
HEADER NAME A:HEADER VALUE a
HEADER NAME B:HEADER VALUE b
..........
REGION HEADER:PLMN IDENTITY
..........
HEADER NAME M:HEADER VALUE m
..........

22:Entity Body

CONTENT DESCRIBED
IN HTML ETC.

Fig. 2A

```
GET http://xxx.xx.xxx.xxx/cgi-bin/header.cgi HTTP/1.1
Host: xxx.xx.xxx.xxx
User-Agent: J-PHONE/5.0/V-XX111/SN350222000003562 XX/YYYYZZZZ Profile/MIDP-1.0
    Configuration/CLDC-1.0 Ext-Profile/JSCL-1.1.0
x-jphone-msname: V-XX111
x-jphone-display: 96*96
x-jphone-color: C65536
x-jphone-sound: 5
x-jphone-smaf: 40/pcm/grf
         ⋮
x-jphone-region: 20020
Accept-Encoding: deflate,gzip
Accept: */*
Referer: http://xxx.xx.xxx.xxx/3g/
Connection: close
```

Fig. 2B

SYSTEM USING INTERNATIONAL ROAMING-CAPABLE MOBILE COMMUNICATION NETWORK

This application is the U.S. National Phase under 35 U.S.C. §371 of International Application PCT/JP2004/013616, filed on Sep. 17, 2004, which claims priority to Japanese Patent Application 2003-327385 filed on Sep. 19, 2003 and Japanese Patent Application 2003-327386 filed on Sep. 19, 2003. All publications, patents, patent applications, databases and other references cited in this application, all related applications referenced herein, and all references cited therein, are incorporated by reference in their entirety as if restated herein in full and as if each individual publication, patent, patent application, database or other reference were specifically and individually indicated to be incorporated by reference.

TECHNICAL FIELD

The present invention relates to a system using an international roaming-capable mobile communication network, a server, an international roaming-capable mobile station, an international roaming-capable mobile communication network system, and a gateway, in which the international roaming-capable mobile station requests a service such as content distribution by accessing the server, which provides the service.

BACKGROUND ART

International roaming is a mobile communication service enabling a user who subscribes to a mobile communication network (home network) having a certain country as a service area to communicate in the service area of a foreign mobile communication network similarly to the manner in which communication is performed in the home network.

Terminal roaming and chip roaming are known as international roaming methods. Terminal roaming is a method of using a mobile station (dual mobile station, composite mobile station) which is capable of communication even after moving (roaming out) from the home network to a foreign mobile communication network (see Japanese Published patent application No. 2001-119750).

Hereinafter, a mobile station which is capable of using at least both of a Japanese W-CDMA (Wideband Code Division Multiple Access) network and a European GSM (GSM: Global System for Mobile Communication) network, which are third generation international standards, will be described using terminal roaming as an example.

FIG. 13 is a block diagram showing an example of the hardware configuration of an international roaming-capable mobile station.

In the drawing, a control unit 106 comprises a CPU (Central Processing Unit), and by means of a control program and an application program stored in memory (ROM/RAM: Read Only Memory/Random Access Memory) 110, the control unit 106 controls a wireless transceiving unit 102 and a voice signal processing unit 103 to perform telephone call-making/call-receiving control and non-telephonic network connection control.

A detachable external memory card may be provided as a part of the memory 110.

The wireless transceiving unit 102 is compatible with a plurality of mobile communication modes (W-CDMA, CDMA2000, GSM).

The user selects one of the plurality of mobile communication modes by manipulating a key input unit 109 in accordance with his/her current position. The control unit 106 sets the internal configuration of the wireless transceiving unit 102 in accordance with the selected mobile communication mode.

The voice signal processing unit 103 subjects voice data demodulated by the wireless transceiving unit 102 to digital/analog conversion and outputs the converted voice data through a speaker (receiver) 104. Meanwhile, a voice signal input through a microphone (transmitter) 105 is subjected to analog/digital conversion and output to the wireless transceiving unit 102 for modulation.

Recent mobile stations have a function for receiving various non-telephonic services (content service) such as a content distribution service via a network.

The control unit 106 is also connected to a display unit 107, a digital camera unit 108, the key input unit 109, and an external interface 111, and thus controls Web page access, image capturing, games, electronic mail reception and transmission, and so on. The key input unit 109 performs content menu selection, distribution request input, and so on. The display unit 107 displays confirmation of key input operations, content menus, downloaded image content, and so on.

Here, content service is not limited to a service for receiving distributed content data, and also signifies the provision by a content provider server of various services corresponding to requests from a mobile station 1.

Accordingly, content service is not limited to the distribution of image data, music data, or programs for games or the like, and includes transaction data for securities transactions and the like, and cases in which money transfers into a bank account, electronic payment by credit card and the like, and so on are performed via a network.

However, when an attempt is made to provide international roaming-capable mobile stations with content service that is provided to stations for domestic use only, various problems occur.

FIG. 14 is an illustrative view showing problems associated with content service caused by international roaming.

In the drawing, 61 denotes an international roaming-capable mobile station.

121 denotes the service area of a domestic (Japanese) mobile communication network (home network), while 122 denotes the service area of a foreign (British, for example) mobile communication network.

123 denotes a server (Web server: World Wide Web server) of a bank (content provider) having a domestic (Japanese) office location, while 124 denotes a server (Web server) of a distribution company (content provider) having a domestic office location.

As a first problematic example, a case in which the mobile station 61 accesses the server 123 of the Japanese bank in order to transfer money into an account will be considered.

The mobile station 61 is located with the domestic service area 121, and hence no problem arises when accessing the server 123 of the Japanese bank via a domestic mobile communication network (wireless access network+core network) and the Internet.

However, when the mobile station 61 accesses the server 123 of the Japanese bank within the foreign service area 122, the country of the service area in which the mobile station 61 is located and the country in which the bank server 123 is located are different, and moreover, there is a time difference between the date and hour of the foreign country and the date and hour in Japan, leading to possible legal effects on the payment process.

As a second problematic example, a case in which the mobile station 61 accesses the server 124 of the Japanese distribution company, purchases copyrighted content, and downloads the content will be considered.

Various cases may be envisaged, such as a case in which the reproduction rights and public transmission rights of the content are contracted according to the country in which the user resides, or a case in which a contract may not have been signed with the country in which the user resides.

Hence, no particular problems arise when the mobile station 61 is within the Japanese service area 121 in which the distribution company has an office location. However, if the mobile station 61 requests content distribution from the distribution company server 124 when located in the foreign service area 122, the form of the service must be altered in accordance with the country in which the mobile station 61 is located in order to comply with the contractual relationship that has been established with that country in relation to the copyright of the content.

As described above, when no legal arrangements are made with regard to the date and hour, the copyright agreement of the distribution content, and so on, various problems arise. Hence, due to the inherent business risk, the content provider side tends to provide no services whatsoever to the international roaming-capable mobile station 61. As a result, the international roaming-capable mobile station 61 cannot receive same services to those provided to stations for domestic use only even when in Japan.

Under the 3GPP (3rd Generation Partnership Project) standard, the server side cannot learn the service area from which the international roaming-capable mobile station 61 performs access.

For comparison, a case in which a personal computer accesses a server by connecting to the Internet from an access point belonging to an Internet provider will now be considered. When the personal computer is connected to the access point, an IP (Internet Protocol) address is allocated to the personal computer by the Internet provider. By determining this IP address, even incompletely, the country in which the personal computer is located can be learned.

However, when the international roaming-capable mobile station 61 roams out to a foreign network, the IP address remains allocated to a switching node of the home network. Hence, even when the mobile station 61 is within the service area of another country, the IP address allocated to the mobile station 61 indicates the home country, and therefore the country of the service area in which the mobile station 61 is located remains unknown.

DISCLOSURE OF THE INVENTION

The present invention has been designed in order to solve the problems described above, and it is an object thereof to provide a system using an international roaming-capable mobile communication network, a server, an international roaming-capable mobile station, an international roaming-capable mobile communication network system, and a gateway, which are used when the international roaming-capable mobile station accesses a server to request a service so that each server can control the form in which the service is provided to a business-appropriate form, in accordance with the service area in which the mobile station is located, the country of the service area, or the country and carrier of the service area.

Some embodiments of the present inventions are described with reference to the numbered paragraphs below:

1. A system using an international roaming-capable mobile communication network in which an international roaming-capable mobile station issues a request for a service to a server via an international roaming-capable mobile communication network, and said server provides said service, characterized in comprising: said international roaming-capable mobile station, which transmits said request for said service to said international roaming-capable mobile communication network; and said server, which receives said request transmitted by said international roaming-capable mobile station and relayed by said international roaming-capable mobile communication network, and controls the form in which said service requested in said received request is provided in accordance with a service area in which said international roaming-capable mobile station is located.

2. The system using an international roaming-capable mobile communication network according to paragraph 1, characterized in that said server controls the form in which said service requested in said received request is provided in accordance with a country of said service area in which said international roaming-capable mobile station is located.

3. The system using an international roaming-capable mobile communication network according to paragraph 1, characterized in that said server controls the form in which said service requested in said received request is provided in accordance with a country of said service area in which said international roaming-capable mobile station is located and a carrier of said service area.

4. A server which receives a request for a service from an international roaming-capable mobile station, and provides said international roaming-capable mobile station with said service, characterized in comprising: service provision form controlling means for controlling the form in which said service requested in said received request is provided in accordance with a service area in which said international roaming-capable mobile station is located.

5. The server according to paragraph 4, characterized in further comprising service area obtaining means for obtaining data regarding said service area in which said international roaming-capable mobile station is located, and characterized in that said service provision form controlling means control the form in which said service requested in said received request is provided in accordance with said service area obtained by said service area obtaining means.

6. The server according to paragraph 5, characterized in that said service area obtaining means obtain said data regarding said service area upon reception of said service request from said international roaming-capable mobile station.

7. The server according to paragraph 6, characterized in that said service area obtaining means obtain said data regarding said service area described in a header added to a header area of said request.

8. The server according to paragraph 4, characterized in further comprising service area determining means for receiving notification of a switching node address of a switching node that receives a connection request from said international roaming-capable mobile station or a switching node that receives a position registration request from said international roaming-capable mobile station, and determining said service area of a mobile communication network to which said switching node belongs in accordance with said switching node address, and characterized in that said service provision form controlling means control the form in which said service requested in said received request is provided in accordance with said service area determined by said service area determining means.

9. The server according to any one of paragraphs 4 through 8, characterized in that said service provision form controlling means control the form in which said service requested in said received request is provided in accordance with a country of said service area in which said international roaming-capable mobile station is located.

10. The server according to any one of paragraphs 4 through 8, characterized in that said service provision form controlling means control the form in which said service requested in said received request is provided in accordance with a country of said service area in which said international roaming-capable mobile station is located and a carrier of said service area.

11. An international roaming-capable mobile station which transmits a request for a service to a server, and is provided with said service by said server, characterized in comprising: service area determining means for determining a service area in which said international roaming-capable mobile station is located; and service area notifying means for causing the form in which said service requested in said request transmitted by said international roaming-capable mobile station is provided to be controlled in accordance with said service area determined by said service area determining means, by notifying said server of said service area.

12. The international roaming-capable mobile station according to paragraph 11, characterized in further comprising carrier setting means for setting a single carrier from among a plurality of carriers in relation to an international roaming-capable mobile communication network system through a selection operation performed by a user, and characterized in that said service area determining means determine said service area in which said international roaming-capable mobile station is located in accordance with said carrier set by said carrier setting means.

13. The international roaming-capable mobile station according to paragraph 11, characterized in further comprising mobile communication mode setting means for setting a single mobile communication mode from among a plurality of mobile communication modes through a selection operation performed by a user, and characterized in that said service area determining means determine said service area in which said international roaming-capable mobile station is located in accordance with said mobile communication mode set by said mobile communication mode setting means.

14. The international roaming-capable mobile station according to paragraph 11, characterized in further comprising notification information receiving means for receiving notification information relating to a mobile communication network system which provides said service area in which said international roaming-capable mobile station is located from a base station located in said service area, and characterized in that said service area determining means determine said service area in which said international roaming-capable mobile station is located from said notification information received by said notification information receiving means.

15. The international roaming-capable mobile station according to paragraph 11, characterized in that said service area notifying means notify said server of said service area determined by said service area determining means when said international roaming-capable mobile station transmits said request to said server.

16. The international roaming-capable mobile station according to paragraph 15, characterized in that said service area notifying means transmit said request to said server after adding a header describing said service area to a header area of said request.

17. The international roaming-capable mobile station according to any one of paragraphs 11 through 16, characterized in that said service area determining means determine a country of said service area in which said international roaming-capable mobile station is located, and said service area notifying means cause the form in which said service requested in said request transmitted by said international roaming-capable mobile station is provided to be controlled in accordance with said country of said service area determined by said service area determining means, by notifying said server of said country of said service area.

18. The international roaming-capable mobile station according to any one of paragraphs 11 through 16, characterized in that said service area determining means determine a country and a carrier of said service area in which said international roaming-capable mobile station is located, and said service area notifying means cause the form in which said service requested in said request transmitted by said international roaming-capable mobile station is provided to be controlled in accordance with said country and said carrier of said service area determined by said service area determining means, by notifying said server of said country and said carrier of said service area.

19. An international roaming-capable mobile communication network system which causes a server to provide a service by relaying a request for said service, transmitted by an international roaming-capable mobile station, to said server, characterized in comprising: service area determining means for determining a service area in which said international roaming-capable mobile station is located; and service area notifying means for causing said server to control the form in which said service requested in said request is provided in accordance with said service area determined by said service area determining means, by notifying said server of said service area.

20. The international roaming-capable mobile communication network system according to paragraph 19, characterized in further comprising switching node address obtaining means for obtaining an address of a switching node which receives a connection request from said international roaming-capable mobile station, and characterized in that said service area determining means determine said service area in which said international roaming-capable mobile station is located in accordance with said switching node address obtained by said switching node address obtaining means.

21. The international roaming-capable mobile communication network system according to paragraph 20, characterized in that said switching node address is an IP address of a mobile packet switching node which receives said connection request from said international roaming-capable mobile station.

22. The international roaming-capable mobile communication network system according to paragraph 20, characterized in that said switching node address obtaining means obtain said address of said switching node which receives said connection request from said international roaming-capable mobile station from a home location register storing said switching node address.

23. The international roaming-capable mobile communication network system according to paragraph 19, characterized in further comprising switching node address obtaining means for obtaining an address of a switching node which receives a position registration request from said international roaming-capable mobile station, and characterized in that said service area determining means determine said service area in which said international roaming-capable mobile station is located in accordance with said switching node address obtained by said switching node address obtaining means.

24. The international roaming-capable mobile communication network system according to paragraph 23, characterized in that said switching node address obtaining means obtain said address of said switching node which receives said position registration request from said international roaming-capable mobile station from a home location register storing said switching node address.

25. The international roaming-capable mobile communication network system according to paragraph 19, characterized in that said service area notifying means notify said server of said service area when said service request transmitted by said international roaming-capable mobile station is relayed to said server.

26. The international roaming-capable mobile communication network system according to paragraph 25, characterized in that said service area notifying means relay said request to said server after adding a header describing said service area to a header area of said request.

27. The international roaming-capable mobile communication network system according to any one of paragraphs 19 through 26, characterized in that said service area notifying means cause said server to control the form in which said service requested in said request is provided in accordance with a country of said service area determined by said service area determining means, by notifying said server of said country of said service area.

28. The international roaming-capable mobile communication network system according to any one of paragraphs 19 through 26, characterized in that said service area notifying means cause said server to control the form in which said service requested in said request is provided in accordance with a country and a carrier of said service area determined by said service area determining means, by notifying said server of said country and said carrier of said service area.

29. An international roaming-capable mobile communication network system which causes a server to provide a service by relaying a request for said service, transmitted by an international roaming-capable mobile station, to said server, characterized in comprising: switching node address obtaining means for obtaining an address of a switching node which receives a connection request from said international roaming-capable mobile station; and switching node address notifying means for causing said server to determine a service area of a mobile communication network to which said switching node belongs, in accordance with said switching node address obtained by said switching node address obtaining means, by notifying said server of said switching node address, and causing said server to control the form in which said service requested in said request is provided in accordance with said determined service area.

30. An international roaming-capable mobile communication network system which causes a server to provide a service by relaying a request for said service, transmitted by an international roaming-capable mobile station, to said server, characterized in comprising: switching node address obtaining means for obtaining an address of a switching node which receives a position registration request from said international roaming-capable mobile station; and switching node address notifying means for causing said server to determine a service area of a mobile communication network to which said switching node belongs, in accordance with said switching node address obtained by said switching node address obtaining means, by notifying said server of said switching node address, and causing said server to control the form in which said service requested in said request is provided in accordance with said determined service area.

31. The international roaming-capable mobile communication network system according to paragraph 29 or paragraph 30, characterized in that said switching node address notifying means cause said server to determine said service area of said mobile communication network to which said switching node belongs in accordance with said switching node address obtained by said switching node address obtaining means, by notifying said server of said switching node address, and cause said server to control the form in which said service requested in said request is provided in accordance with a country of said determined service area.

32. The international roaming-capable mobile communication network system according to paragraph 29 or paragraph 30, characterized in that said switching node address notifying means cause said server to determine said service area of said mobile communication network to which said switching node belongs in accordance with said switching node address obtained by said switching node address obtaining means, by notifying said server of said switching node address, and cause said server to control the form in which said service requested in said request is provided in accordance with a country and a carrier of said determined service area.

33. A gateway in an international roaming-capable mobile communication network system which causes a server to provide a service by relaying a request for said service, transmitted by an international roaming-capable mobile station, to said server via a packet relay switching network and the Internet, said gateway being provided between said packet relay switching network and said Internet and being characterized in comprising: service area determining means for determining a service area in which said international roaming-capable mobile station is located; and service area notifying means for causing said server to control the form in which said service requested in said request is provided in accordance with said service area determined by said service area determining means, by notifying said server of said service area.

34. The gateway according to paragraph 33, characterized in that said service area notifying means cause said server to control the form in which said service requested in said request is provided in accordance with a country of said service area determined by said service area determining means, by notifying said server of said country of said service area.

35. The gateway according to paragraph 33, characterized in that said service area notifying means cause said server to control the form in which said service requested in said request is provided in accordance with a country and a carrier of said service area determined by said service area determining means, by notifying said server of said country and said carrier of said service area.

36. A gateway in an international roaming-capable mobile communication network system which causes a server to provide a service by relaying a request for said service, transmitted by an international roaming-capable mobile station, to said server via a packet relay switching network and the Internet, said gateway being provided between said packet relay switching network and said Internet and being characterized in comprising: switching node address obtaining means for obtaining an address of a switching node which receives a connection request from said international roaming-capable mobile station; and switching node address notifying means for causing said server to determine a service area of a mobile communication network to which said switching node belongs, in accordance with said switching node address obtained by said switching node address obtaining means, by notifying said server of said switching node address, and causing said server to control the form in which said service requested in said request is provided in accordance with said determined service area.

37. A gateway in an international roaming-capable mobile communication network system which causes a server to provide a service by relaying a request for said service, transmitted by an international roaming-capable mobile station, to said server via a packet relay switching network and the Internet, said gateway being provided between said packet relay switching network and said Internet and being characterized in comprising: switching node address obtaining means for obtaining an address of a switching node which receives a position registration request from said international roaming-capable mobile station; and switching node address notifying means for causing said server to determine a service area of a mobile communication network to which said switching node belongs, in accordance with said switching node address obtained by said switching node address obtaining means, by notifying said server of said switching node address, and causing said server to control the form in which said service requested in said request is provided in accordance with said determined service area.

38. The gateway according to paragraph 36 or paragraph 37, characterized in that said switching node address notifying means cause said server to determine said service area of said mobile communication network to which said switching node belongs, in accordance with said switching node address obtained by said switching node address obtaining means, by notifying said server of said switching node address, and cause said server to control the form in which said service requested in said request is provided in accordance with a country of said determined service area.

39. The gateway according to paragraph 36 or paragraph 37, characterized in that said switching node address notifying means cause said server to determine said service area of said mobile communication network to which said switching node belongs, in accordance with said switching node address obtained by said switching node address obtaining means, by notifying said server of said switching node address, and cause said server to control the form in which said service requested in said request is provided in accordance with a country and a carrier of said determined service area.

The present invention is a system using an international roaming-capable mobile communication network according to an invention of paragraph 1, in which an international roaming-capable mobile station issues a request for a service to a server via an international roaming-capable mobile communication network, and the server provides the service, characterized in comprising: the international roaming-capable mobile station, which transmits the service request to the international roaming-capable mobile communication network; and the server, which receives the request transmitted by the international roaming-capable mobile station and relayed by the international roaming-capable mobile communication network, and controls the form in which the service requested in the received request is provided in accordance with a service area in which the international roaming-capable mobile station is located.

Hence, the server is able to provide a business-appropriate service by freely controlling the form in which the service is provided in accordance with the service area in which the international roaming-capable mobile station is located.

In the invention according to paragraph 2, the server of the invention according to paragraph 1 controls the form in which the service is provided in accordance with a country of the service area in which the international roaming-capable mobile station is located, while in an invention according to paragraph 3, the server of the invention according to paragraph 1 controls the form in which the service is provided in accordance with the country of the service area and a carrier of the service area.

Information enabling specification of the country is sufficient as the information regarding the service area in which the mobile station is located. In certain cases, it is sufficient simply to differentiate between "domestic" and "foreign". The carrier may be specified in addition to the country.

As regards the form in which the service is provided, when the service area of the international roaming-capable mobile station is domestic, for example, a same service as that received by a mobile station for domestic use only is received, and when the service area is foreign, no service is received. Alternatively, service provision may be controlled according to the country of the service area in which the international roaming-capable mobile station is located.

The inventions according to paragraphs 4 through 10 relate to the server. The inventions according to paragraphs 5 through 7 and the invention according to paragraph 8 relate to different types of server.

The invention according to paragraph 4 is server which receives a request for a service from an international roaming-capable mobile station, and provides the international roaming-capable mobile station with the service, characterized in comprising service provision form controlling means for controlling the form in which the service requested in the received request is provided in accordance with a service area in which the international roaming-capable mobile station is located.

In the invention according to paragraph 5, the server according to paragraph 4 further comprises service area obtaining means for obtaining data regarding the service area in which the international roaming-capable mobile station is located, and the service provision form controlling means control the form in which the service requested in the received request is provided in accordance with the service area obtained by the service area obtaining means. In the invention according to paragraph 6, the service area obtaining means of the server according to paragraph 5 obtain the data regarding the service area upon reception of the service request from the international roaming-capable mobile station.

In the invention according to paragraph 7, the service area obtaining means of the server according to paragraph 6 obtain the data regarding the service area described in a header added to a header area of the request.

In the invention according to paragraph 8, the server according to paragraph 4 further comprises service area determining means for receiving notification of a switching node address of a switching node that receives a connection request from the international roaming-capable mobile station or a switching node that receives a position registration request from the international roaming-capable mobile station, and determining the service area of a mobile communication network to which the switching node belongs in accordance with the switching node address, and the service provision form controlling means control the form in which the service requested in the received request is provided in accordance with the service area determined by the service area determining means.

The service provision form controlling means of the server according to any one of paragraphs 4 through 8 control the form in which the service requested in the received request is provided in accordance with a country of the service area in which the international roaming-capable mobile station is located in the invention according to paragraph 9, and in accordance with the country of the service area and a carrier of the service area in the invention according to paragraph 10.

The inventions according to paragraphs 11 through 18 relate to the international roaming-capable mobile station.

The invention according to paragraph 11 is an international roaming-capable mobile station which transmits a request for a service to a server, and is provided with the service by the server, characterized in comprising: service area determining means for determining a service area in which the international roaming-capable mobile station is located; and service area notifying means for causing the form in which the service requested in the request transmitted by the international roaming-capable mobile station is provided to be controlled in accordance with the service area determined by the service area determining means, by notifying the server of the service area.

Hence, the server is able to provide a business-appropriate service by freely controlling the form in which the service is provided in accordance with the country of the service area in which the international roaming-capable mobile station is located.

In the invention according to paragraph 12, the international roaming-capable mobile station according to paragraph 11 further comprises carrier setting means for setting a single carrier from among a plurality of carriers in relation to an international roaming-capable mobile communication network system through a selection operation performed by a user, and the service area determining means determine the service area in which the international roaming-capable mobile station is located in accordance with the carrier set by the carrier setting means.

In the invention according to paragraph 13, the international roaming-capable mobile station according to paragraph 11 further comprises mobile communication mode setting means for setting a single mobile communication mode from among a plurality of mobile communication modes through a selection operation performed by a user, and the service area determining means determine the service area in which the international roaming-capable mobile station is located in accordance with the mobile communication mode set by the mobile communication mode setting means.

Hence, the service area can be determined easily using the pre-existing mobile communication mode setting means provided in the international roaming-capable mobile station.

In the invention according to paragraph 14, the international roaming-capable mobile station according to paragraph 11 further comprises notification information receiving means for receiving notification information relating to a mobile communication network system which provides the service area in which the international roaming-capable mobile station is located from a base station located in the service area, and the service area determining means determine the service area in which the international roaming-capable mobile station is located from the notification information received by the notification information receiving means.

Hence, the service area can be determined easily using the notification information relating the mobile communication network system, which is provided in a conventional mobile communication network system.

In the invention according to paragraph 15, the service area notifying means of the international roaming-capable mobile station according to paragraph 11 notify the server of the service area determined by the service area determining means when the international roaming-capable mobile station transmits the request to the server.

A new procedure for notifying the server of the service area may be provided, but by adding information regarding the service area to the pre-existing "request", the need for a new procedure is eliminated.

In the invention according to paragraph 16, the service area notifying means of the international roaming-capable mobile station according to paragraph 15 transmit the request to the server after adding a header describing the service area to a header area of the request.

The service area may be written into the entity body of a conventional "request", but by expanding the header area, the service area information can be added easily to the pre-existing "request". Further, a new "request" is compatible with a conventional "request", and therefore the server can be notified of the service area without causing the pre-existing server to malfunction.

In the invention according to paragraph 17, the service area determining means of the international roaming-capable mobile station according to any one of paragraphs 11 through 16 determine a country of the service area in which the international roaming-capable mobile station is located, and the service area notifying means cause the form in which the service requested in the request transmitted by the international roaming-capable mobile station is provided to be controlled in accordance with the country of the service area determined by the service area determining means, by notifying the server of the country of the service area.

In the invention according to paragraph 18, on the other hand, the service area determining means determine a country and a carrier of the service area in which the international roaming-capable mobile station is located, and the service area notifying means cause the form in which the service requested in the request transmitted by the international roaming-capable mobile station is provided to be controlled in accordance with the country and the carrier of the service area determined by the service area determining means, by notifying the server of the country and the carrier of the service area.

Information enabling specification of the country is sufficient as the information of the service area in which the mobile station is located. In certain cases, it is sufficient simply to differentiate between "domestic" and "foreign". The carrier may be specified in addition to the country.

As regards the form in which the service is provided, when the service area of the international roaming-capable mobile station is domestic, for example, a same service as that received by a mobile station for domestic use only is received, and when the service area is foreign, no service is received. Alternatively, service provision may be controlled according to the country of the service area in which the international roaming-capable mobile station is located.

The inventions according to paragraphs 19 through 32 relate to the international roaming-capable mobile communication network system. The inventions according to paragraphs 19 through 28 and the inventions according to paragraphs 29 and 30 relate to different types of international roaming-capable mobile communication network system.

The invention according to paragraph 19 is an international roaming-capable mobile communication network system which causes a server to provide a service by relaying a request for the service, transmitted by an international roaming-capable mobile station, to the server, characterized in comprising: service area determining means for determining a service area in which the international roaming-capable mobile station is located; and service area notifying means for causing the server to control the form in which the service requested in the request is provided in accordance with the service area determined by the service area determining means, by notifying the server of the service area.

Hence, the server is able to provide a business-appropriate service by freely controlling the form in which the service is provided in accordance with an association corresponding to the country of the service area in which the international roaming-capable mobile station is located.

Note that the service area determining means and service area notifying means can be provided even when the configuration of the international roaming-capable mobile communication network system is limited to a configuration within the home network country.

In the invention according to paragraph 20, the international roaming-capable mobile communication network system according to paragraph 19 further comprises switching node address obtaining means for obtaining an address of a switching node which receives a connection request from the international roaming-capable mobile station, and the service area determining means determine the service area in which the international roaming-capable mobile station is located in accordance with the switching node address obtained by the switching node address obtaining means.

Hence, the service area can be determined easily using the address of the switching node which receives the connection request from the international roaming-capable mobile station.

The address of the switching node that receives the connection request from the international roaming-capable mobile station may be any address, such as an IP address, which enables differentiation of the switching node within the mobile communication network system.

In other words, in the invention according to paragraph 21, the switching node address is an IP address of a mobile packet switching node which receives the connection request from the international roaming-capable mobile station.

In the invention according to paragraph 22, the switching node address obtaining means of the international roaming-capable mobile communication network system according to paragraph 20 obtain the switching node address from a home location register storing the switching node address.

Meanwhile, in the invention according to paragraph 23, the international roaming-capable mobile communication network system according to paragraph 19 further comprises switching node address obtaining means for obtaining an address of a switching node which receives a position registration request from the international roaming-capable mobile station, and the service area determining means determine the service area in which the international roaming-capable mobile station is located in accordance with the switching node address obtained by the switching node address obtaining means.

In the invention according to paragraph 24, the switching node address obtaining means of the international roaming-capable mobile communication network system according to paragraph 23 obtain the address of the switching node which receives the position registration request from the international roaming-capable mobile station from a home location register storing the switching node address.

In the invention according to paragraph 25, the service area notifying means of the international roaming-capable mobile communication network system according to paragraph 19 notify the server of the service area when the service request transmitted by the international roaming-capable mobile station is relayed to the server.

A new procedure for notifying the server of the service area may be provided, but by adding information regarding the service area to the preexisting "request", the need for a new procedure is eliminated.

In the invention according to paragraph 26, the service area notifying means of the international roaming-capable mobile communication network system according to paragraph 25 relay the request to the server after adding a header describing the service area to a header area of the request.

The country may be written into the entity body of the pre-existing "request", but by expanding the header area, the service area information can be added simply to the pre-existing "request". Further, the request is compatible with a conventional "request", and therefore the server can be notified of the country without causing the pre-existing server to malfunction.

In the invention according to paragraph 27, the service area notifying means of the international roaming-capable mobile communication network system according to any one of paragraphs 19 through 26 cause the server to control the form in which the service requested in the request is provided in accordance with a country of the service area determined by the service area determining means, by notifying the server of the country of the service area. In the invention according to paragraph 28, on the other hand, the service area notifying means of the international roaming-capable mobile communication network system cause the server to control the form in which the service requested in the request is provided in accordance with a country and a carrier of the service area, by notifying the server of the country and the carrier of the service area.

The invention according to paragraph 29 is an international roaming-capable mobile communication network system which causes a server to provide a service by relaying a request for the service, transmitted by an international roaming-capable mobile station, to the server, characterized in comprising: switching node address obtaining means for obtaining an address of a switching node which receives a connection request from the international roaming-capable mobile station; and switching node address notifying means for causing the server to determine a service area of a mobile communication network to which the switching node belongs, in accordance with the switching node address obtained by the switching node address obtaining means, by notifying the server of the switching node address, and causing the server to control the form in which the service requested in the request is provided in accordance with the determined service area.

Meanwhile, the invention according to paragraph 30 is an international roaming-capable mobile communication network system which causes a server to provide a service by relaying a request for the service, transmitted by an international roaming-capable mobile station, to the server, characterized in comprising: switching node address obtaining means for obtaining an address of a switching node which receives a position registration request from the international roaming-capable mobile station; and switching node address notifying means for causing the server to determine a service area of a mobile communication network to which the switching node belongs, in accordance with the switching node address obtained by the switching node address obtaining means, by notifying the server of the switching node address, and causing the server to control the form in which the service requested in the request is provided in accordance with the determined service area.

Hence, the server is able to provide a business-appropriate service by freely controlling the form in which the service is provided in accordance with an association corresponding to the country of the service area in which the international roaming-capable mobile station is located.

In the international roaming-capable mobile communication network system, there is no need for a constitution for determining the service area of the international roaming-capable mobile station in accordance with the address of the switching node which receives the connection request or the address of the switching node which receives the position registration request.

The address of the switching node that receives the connection request from the international roaming-capable mobile station is an IP address of a mobile packet switching node, a mobile packet switching node address, or similar.

In the international roaming-capable mobile communication network system according to paragraph 29 or paragraph 30, the switching node address notifying means cause the server to determine the service area of the mobile communication network to which the switching node belongs, in accordance with the switching node address obtained by the switching node address obtaining means, by notifying the server of the switching node address, and cause the server to control the form in which the service is provided in accordance with a country of the determined service area in the invention according to paragraph 31, and in accordance with a country and a carrier of the determined service area in the invention according to paragraph 32.

Information specifying the country is sufficient as the information of the service area in which the mobile station is located. In certain cases, it is sufficient simply to differentiate between "domestic" and "foreign". The carrier may be specified in addition to the country.

Note that the service area determining means and service area notifying means can be provided even when the configuration of the international roaming-capable mobile communication network system is limited to a configuration within the home network country.

The inventions according to paragraphs 33 through 39 relate to the gateway. The inventions according to paragraphs 33 through 35 and the inventions according to paragraphs 36 through 39 relate to different types of gateway.

The invention according to paragraph 33 is a gateway in an international roaming-capable mobile communication network system which causes a server to provide a service by relaying a request for the service, transmitted by an international roaming-capable mobile station, to the server via a packet relay switching network and the Internet, the gateway being provided between the packet relay switching network and the Internet and being characterized in comprising: service area determining means for determining a service area in which the international roaming-capable mobile station is located; and service area notifying means for causing the server to control the form in which the service requested in the request is provided in accordance with the service area determined by the service area determining means, by notifying the server of the service area.

Hence, similarly to the invention according to paragraph 19, the server is able to provide a business-appropriate service by freely controlling the form in which the service is provided in accordance with an association corresponding to the country of the service area in which the international roaming-capable mobile station is located.

Since the gateway is provided with the service area determining means and service area notifying means, there is no need for any great modifications to the internal configuration of a conventional international roaming-capable mobile communication network system.

In the invention according to paragraph 34, the service area notifying means of the gateway according to paragraph 33 cause the server to control the form in which the service requested in the request is provided in accordance with a country of the service area determined by the service area determining means, by notifying the server of the country of the service area.

In the invention according to paragraph 35, on the other hand, the service area notifying means cause the server to control the form in which the service requested in the request is provided in accordance with a country and a carrier of the service area by notifying the server of the country and the carrier of the service area.

The invention according to paragraph 36 is a gateway in an international roaming-capable mobile communication network system which causes a server to provide a service by relaying a request for the service, transmitted by an international roaming-capable mobile station, to the server via a packet relay switching network and the Internet, the gateway being provided between the packet relay switching network and the Internet and being characterized in comprising: switching node address obtaining means for obtaining an address of a switching node which receives a connection request from the international roaming-capable mobile station; and switching node address notifying means for causing the server to determine a service area of a mobile communication network to which the switching node belongs, in accordance with the switching node address obtained by the switching node address obtaining means, by notifying the server of the switching node address, and causing the server to control the form in which the service requested in the request is provided in accordance with the determined service area.

Meanwhile, the invention according to paragraph 37 is a gateway in an international roaming-capable mobile communication network system which causes a server to provide a service by relaying a request for the service, transmitted by an international roaming-capable mobile station, to the server via a packet relay switching network and the Internet, the gateway being provided between the packet relay switching network and the Internet and being characterized in comprising: switching node address obtaining means for obtaining an address of a switching node which receives a position registration request from the international roaming-capable mobile station; and switching node address notifying means for causing the server to determine a service area of a mobile communication network to which the switching node belongs, in accordance with the switching node address obtained by the switching node address obtaining means, by notifying the server of the switching node address, and causing the server to control the form in which the service requested in the request is provided in accordance with the determined service area.

Hence, similarly to the invention according to paragraph 29 or paragraph 30, the server is able to provide a business-appropriate service by freely controlling the form in which the service is provided in accordance with an association corresponding to the country of the service area in which the international roaming-capable mobile station is located.

Since the gateway is provided with the service area determining means and service area notifying means, there is no need for any great modifications to the internal configuration of a conventional international roaming-capable mobile communication network system.

In the invention according to paragraph 38, the switching node address notifying means of the gateway according to paragraph 36 or paragraph 37 cause the server to determine the service area of the mobile communication network to which the switching node belongs, in accordance with the switching node address obtained by the switching node address obtaining means, by notifying the server of the switching node address, and cause the server to control the form in which the service requested in the request is provided in accordance with a country of the determined service area.

In the invention according to paragraph 39, on the other hand, the server is caused to control the form in which the service requested in the request is provided in accordance with a country and a carrier of the determined service area.

EFFECT OF THE INVENTION

According to the present invention, a server providing a service is capable of discriminating a service area in which an international roaming-capable mobile station is located, and therefore, by having a content provider server preset countries in which services such as a financial service, a ring tone distribution service, and a character distribution service can be provided, the services can be provided in a form which is suited to the business of the respective content providers.

Content which may only be provided to stations for domestic use only can be distributed to the international roaming-capable mobile station, which is advantageous to both the content provider and the mobile station user.

Furthermore, an effect of either eliminating the need to update a conventional international roaming-capable mobile communication network system, or enabling use of a conventional international roaming-capable mobile station without modification, can be obtained.

BRIEF DESCRIPTION OF THE DRAWINGS

FIG. 2A is an illustrative view of an HTTP request;

FIG. 2B is an illustrative view of an HTTP header;

BEST MODE FOR CARRYING OUT THE INVENTION

Figure 1:
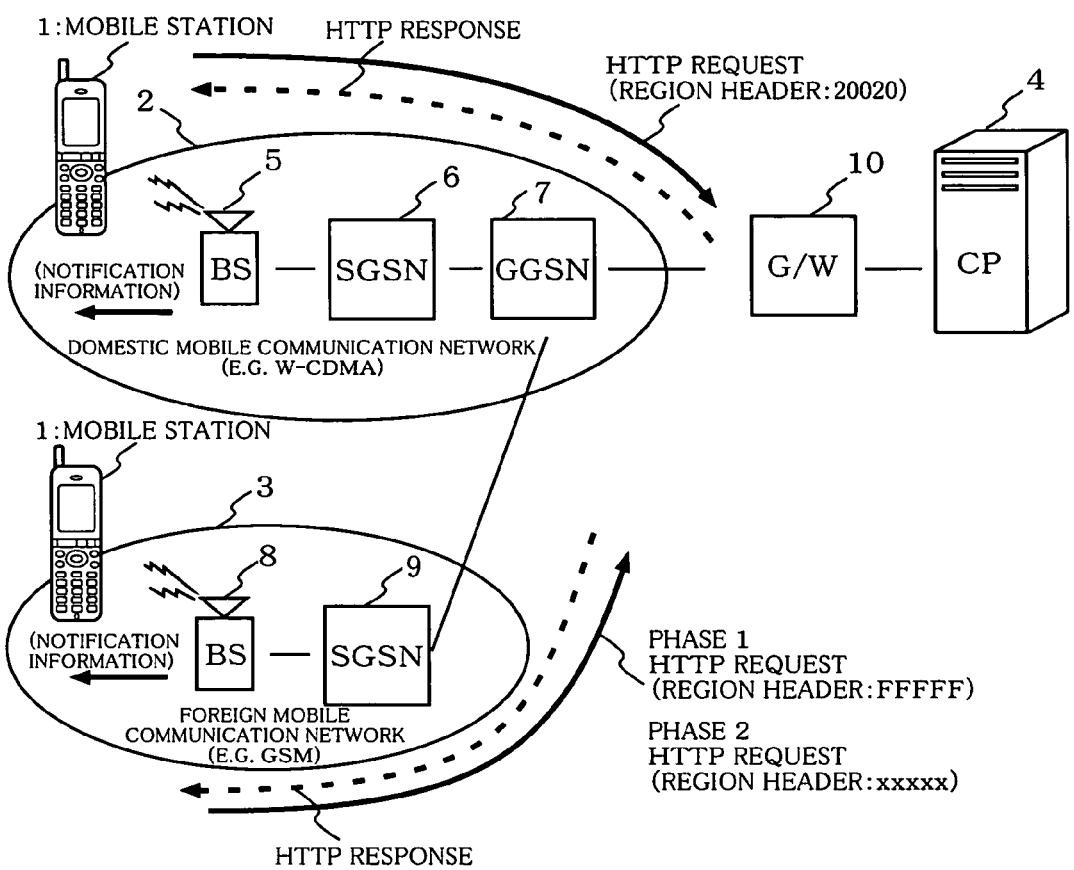
FIG. 1 is an overall constitutional diagram of a system using an international roaming-capable mobile communication network according to an embodiment of the present invention.

FIG. 1 is an overall constitutional diagram of a system using an international roaming-capable mobile communication network according to an embodiment of the present invention.

1 denotes an international roaming-capable mobile station.

Figure 14:
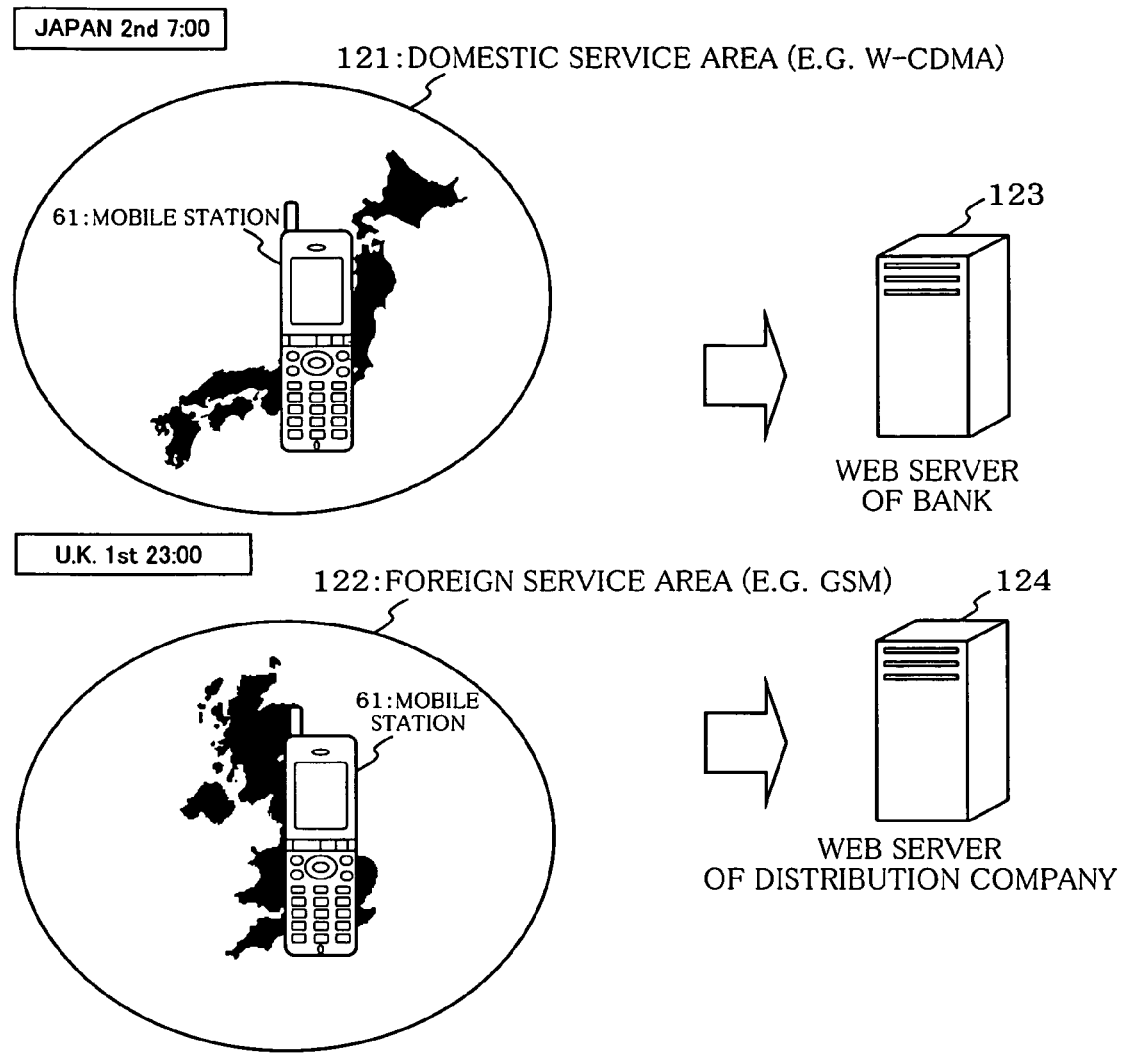
FIG. 14 is an illustrative diagram showing problems arising in a content distribution service due to international roaming.

2 denotes a domestic (Japanese) mobile communication network (home network) constituted by a W-CDMA network, for example. 3 denotes a foreign mobile communication network (other network) constituted by a GSM network, for example. 4 denotes a domestic content provider server (Web server) constituted by the bank server 123 or distribution company server 124 shown in FIG. 14, for example.

In the domestic mobile communication network 2, 5 is a base station BS, 6 is a mobile packet switching node SGSN (serving GPRS support node), and 7 is a gateway packet switching node GGSN (gateway GPRS support node).

The mobile station 1 and base station 5 constitute a wireless access network.

The mobile packet switching node SGSN 6 and gateway packet switching node GGSN 7 are within a core network, and are constituted by switching nodes for a packet bearer service GPRS (General Packet Radio Service) provided on GSM (Global System for Mobile Communication), for example.

The mobile packet switching node SGSN serves as a gateway between the wireless access network and the packet switching core network, and is an IP router having a mobile communication-specific control function.

The gateway packet switching node GGSN serves as a gateway between the packet switching core network and a packet switching relay network, and is an IP firewall router having a mobile communication-specific control function.

Meanwhile, in the foreign mobile communication network 3, 8 is a base station BS and 9 is a mobile packet switching node SGSN. The mobile packet switching node SGSN 9 is connected to the gateway packet switching node GGSN 7 in the domestic mobile communication network 2.

10 is a gateway (G/W) located domestically (within the country of the home network) between the packet switching relay network and the Internet. The gateway 10 connects to the domestic content provider server 4 via the Internet.

The mobile station 1 is an international roaming-capable mobile station capable of similar communication whether in the service area of the domestic mobile communication network 2 or the service area of the foreign network 3.

The mobile station 1 transmits a request for a service from within the service area of the domestic (Japanese) mobile communication network 2 or the service area of the foreign mobile communication network 3.

The content provider server 4 receives the request transmitted by the mobile station 1 and relayed by the domestic (Japanese) mobile communication network 2 and/or the foreign mobile communication network 3, and controls the form in which the service requested in the received request is provided according to the country of the service area in which the mobile station 1 is located.

Here, a plurality of embodiments are derived according to the block which possesses functions for determining the service area in which the mobile station 1 is located.

Referring to FIG. 1, an embodiment in which these functions are on the mobile station 1 side will be described.

Figure 6:
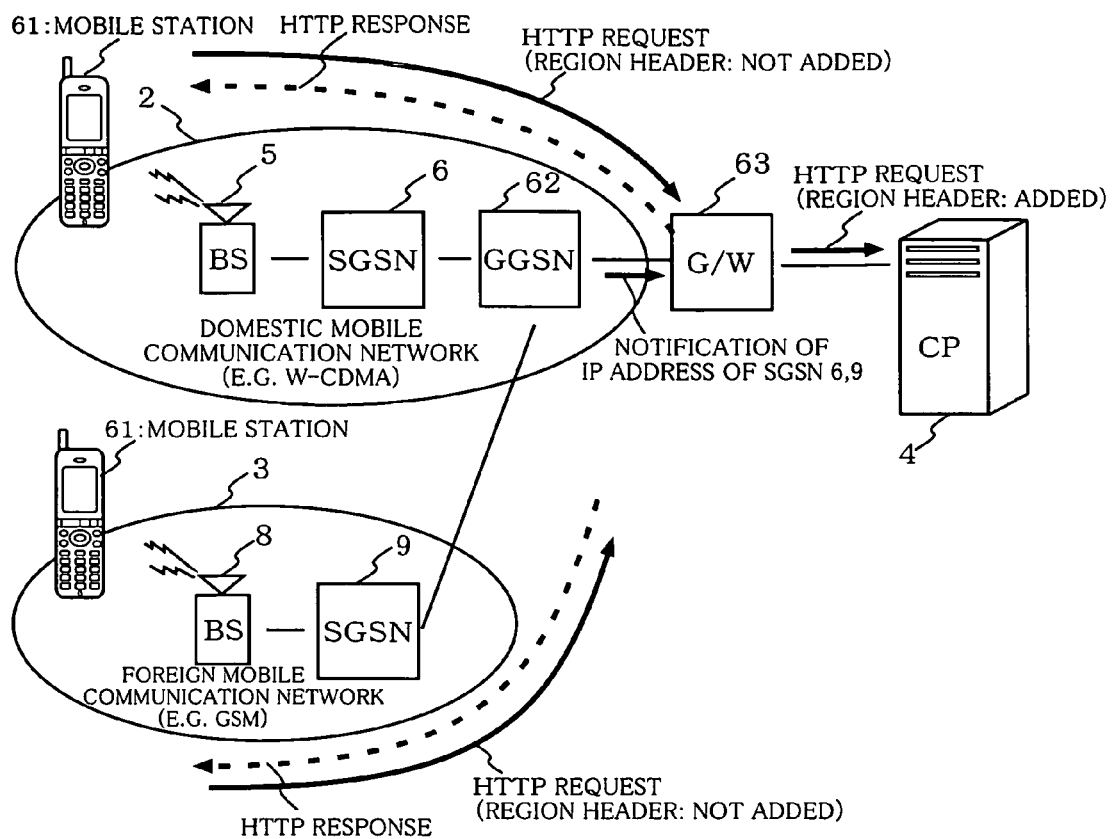
FIG. 6 is an overall constitutional diagram of a system using an international roaming-capable mobile communication network according to another embodiment of the present invention.

Referring to FIG. 6 below, an embodiment in which these functions are on the mobile communication network side and an embodiment in which the functions are on the content provider server 4 side will be described.

In FIG. 1, the mobile station 1 comprises a function for autonomously determining the service area in which it is located. The mobile station 1 also comprises a function for controlling the form in which a service requested by the mobile station 1 is provided in accordance with the country of the determined service area by notifying the content provider server 4 of the determined service area.

This service area determination function will be described below with reference to FIGS. 3 and 4. First, the function for providing notification of the service area will be described.

When the mobile station 1 transmits an HTTP (Hypertext Transfer Protocol) request for a service to the content provider server 4, the mobile station 1 simultaneously notifies the content provider server 4 of the service area determined by the service area determination function.

More specifically, a region header describing the service area is added to the header area of the HTTP request, whereupon the HTTP request is transmitted to the content provider server 4.

The content provider server 4 obtains the service area data added to the HTTP request from the mobile station 1. Then, in accordance with the country of the service area and considering the effect on its content business, the content provider server 4 controls processing such as content distribution performed in relation to the request, to its own advantage.

When the content provider server 4 receives the HTTP request and distributes content to the mobile station 1, the content is downloaded in accordance with an HTTP response.

Here, the service area of the mobile station 1 is transmitted unsolicited, together with the HTTP request, rather than being provided in response to a request from the content provider server 4. Depending on the content provider server 4, processing corresponding to the country of the service area may not be performed. In this case, the region header is simply ignored and the server is not impaired.

FIG. 2 is an illustrative view of the HTTP request and HTTP header.

As shown in FIG. 2A, the HTTP request comprises an HTTP header area 21 and an entity body area 22.

FIG. 2B shows an example of the HTTP header 21, although description thereof has been omitted.

A plurality of types of control data are included in the HTTP header area 21. The control data are described in series in repeated pairs consisting of a header name and the header value thereof. A "region header" 21a indicating roaming information is added to the control data in the conventional HTTP header area 21 as an expanded header.

Meanwhile, the entity body area 22 includes a document written in an HTML (Hypertext Markup Language) format.

The region header 21a has "x-jphone-region", for example, as a header name, and roaming information as the header value thereof. The roaming information uses a PLMN identity (Public Land Mobile Network Identity), which is a mobile communication network identifier defined in 10.3.1.11 of TS25.331 in 3GPP (3rd Generation Partnership Project), for example.

The first three digits of the mobile communication network identifier PLMN identity are a country identifier (MCC: Mobile Country Code), and the last two digits are a carrier identifier (MNC: Mobile Network Code). Hence, the service area of the mobile communication network is denoted by the country and the carrier.

When the mobile station 1 is within the service area of the domestic (Japanese) mobile communication network 2, the mobile communication network identifier PLMN identity is "20020". Here, the first three digits "200" are the country identifier MCC for Japan, and the last two digits "20" are the carrier identifier MNC for "J-Phone Ltd.".

When the mobile station 1 is within the service area of the foreign network 3, the communication network identifier PLMN identity likewise indicates the service area. In certain cases, however, notification need only be provided as to whether the service area is domestic or foreign. Hence, when the mobile station 1 is within the service area of the foreign network 3, the communication network identifier PLMN identity may be set to "FFFFF", for example. Here, the first three digits "FFF" are a country identifier (MCC: Mobile Country Code) indicating a foreign country.

Next, the aforementioned function for determining the service area of the mobile station 1 will be described. Depending on the development stage of the present invention, this determination function takes a phase 1 constitution, serving as a first embodiment, or a phase 2 constitution, serving as a second embodiment.

Figure 3A:
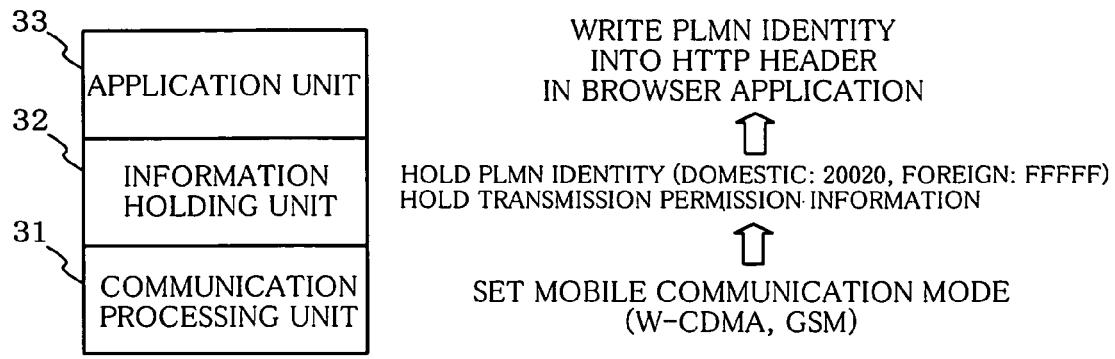
FIG. 3A is an illustrative view of internal processing performed in a mobile station in a phase 1.
Figure 3B:
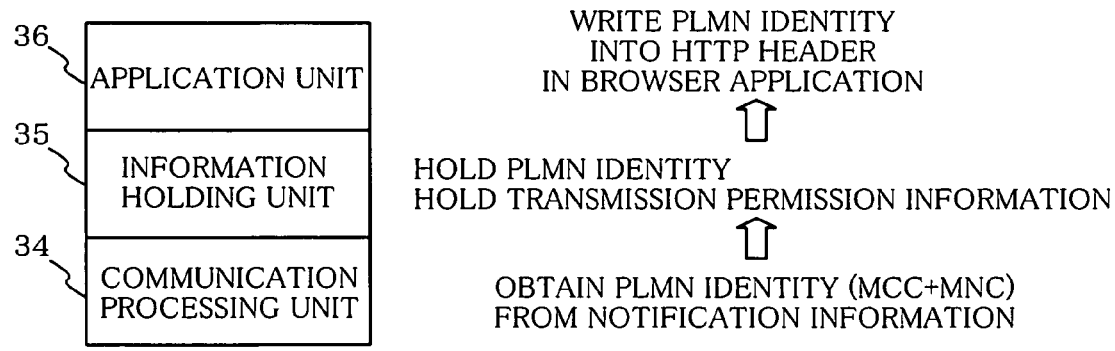
FIG. 3B is an illustrative view of internal processing performed in a mobile station in a phase 2.

FIG. 3A is an illustrative view of the internal processing performed in the mobile station 1 in phase 1, and FIG. 3B is an illustrative view of the internal processing performed in the mobile station 1 in phase 2.

First, the phase 1 constitution will be described.

31 is a communication processing unit, 32 is an information holding unit, and 33 is an application unit.

Figure 13:
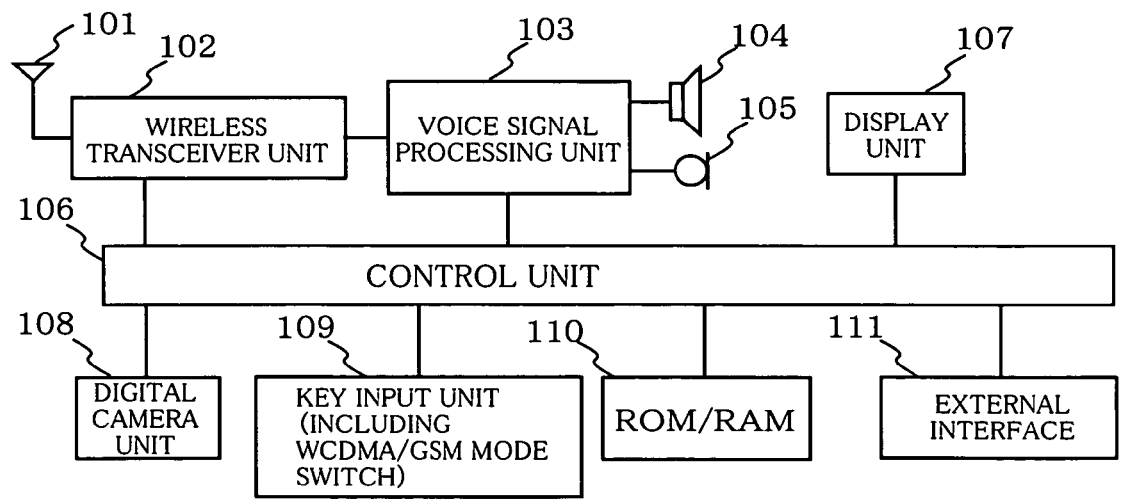
FIG. 13 is a block diagram showing an example of the hardware configuration of an international roaming-capable mobile station.

Note that the hardware configuration of the mobile station 1 is based on the configuration shown in FIG. 13.

The communication processing unit 31 comprises a mobile communication mode setting function and the function for determining the service area of the mobile station 1.

When the key input unit 109 of FIG. 13 detects a selection operation performed by the user, the mobile communication mode setting function sets a mobile communication mode from among a plurality of mobile communication modes such as a W-CDMA mode and a GSM mode.

For example, the key input unit 109 of the mobile station 1 is provided with a key for switching between "W-CDMA. and "GSM". Alternatively, a mobile communication mode selection screen is displayed on the display unit 107, and the user makes a selection from "W-CDMA", "GSM", and so on from the screen by means of key operations.

The service area determination function determines the service area of the mobile station 1 in accordance with the mobile communication mode set by the mobile communication mode setting function.

More specifically, when the user selects the W-CDMA mode, the wireless transceiving unit 102 is set to the W-CDMA mode, and therefore the service area determination function determines that the mobile station 1 is in Japan.

On the other hand, when the user selects the GSM mode, the wireless transceiving unit 102 is set to the GSM mode, and therefore the service area determination function determines that the mobile station 1 is abroad.

Alternatively, a country mode setting screen is displayed on the display unit 107, and the user selects one of "domestic" and "foreign" from the screen by pressing a key. By means of this selection operation, the interior of the mobile station 1 is set to "W-CDMA" when the mobile communication mode is set to "domestic", and to "GSM" when the mobile communication mode is set to "foreign".

Note that since an inappropriate country may be inputted by the selection operation of the user, the mobile station 1 may employ a constitution to determine whether or not the country selected by the user is appropriate and deny communication when the selected country is inappropriate.

Alternatively, an "area mode selection" screen is displayed on the display unit 107, and the user makes a selection from "domestic (Japan)", "foreign (GSM 900 MHz band, GSM 1800 MHz band)", and "foreign (GSM 1800 MHz band)" by pressing a key. When "foreign (GSM 900 MHz band, GSM 1800 MHz band)" or "foreign (GSM 1800 MHz band)" is selected, the display unit 107 switches to a "telecommunications carrier selection (operator selection)" screen, and a list of carriers (operators) using the respective mobile communication modes is displayed.

As regards the association between the mobile communication mode and the country, "CDMA2000" may be used to indicate "domestic" and "GSM" may be used to indicate "foreign", depending on the mobile communication network.

Here, when mobile communication network setting is performed by selecting the carrier "manually", it is assumed that the mobile station 1 is within the service area of the selected carrier, and hence position registration processing in relation to the base station is begun in the mobile communication mode and at the frequency that are allocated to the carrier.

When the mobile station 1 is within the service area of the set carrier and an international roaming use contract has been signed, position registration is performed to enable communication. However, when the mobile station 1 is not within the service area of the selected, set carrier, or when an international roaming use contract has not been signed, communication cannot be performed.

Carriers are divided according to country (for example, Vodafone NL, Vodafone UK), and therefore, by setting the carrier, the country of the service area in which the mobile station 1 is located (including simply "domestic" and "foreign") can be set together with the carrier of the service area in which the mobile station 1 is located.

Successful position registration indicates that the operations performed by the user to set the mobile communication mode and frequency, and to set the country of the service area in which the mobile station 1 is located and the service area carrier, have been performed correctly.

On the "telecommunications carrier selection (operator selection)" screen, the carrier may be selected and set "automatically". For example, the carriers for selection are switched automatically and sequentially, and position registration processing with the base station is begun assuming that the mobile station 1 is within the service area of the corresponding carrier. When the mobile station 1 is within the service area of the selected carrier and an international roaming use contract has been signed, position registration is performed, enabling communication.

When the mobile station 1 is not within the service area of the switched carrier or an international roaming use contract has not been signed, position registration is not performed. In this case, the next carrier is switched to and another attempt at position registration is made. When position registration is successful, the carrier at that time is set.

In the above description, the mobile communication mode and frequency are selected first, whereupon the carrier is selected. However, the user may select a carrier from the carrier list regardless of the mobile communication mode and frequency. If position registration is possible as a result of the selection, the mobile communication mode, frequency, and country of the service area in which the mobile station 1 is located (including a setting of "domestic" or "foreign") are set in relation to the mobile communication network in accordance with the carrier selection.

The user may also select a country from a country list. If position registration is possible as a result of the selection, the mobile communication mode, frequency, country of the service area in which the mobile station 1 is located (including a setting of "domestic" or "foreign"), and carrier are set in accordance with the country selection. When a plurality of carriers exist in a single country, a single carrier may be selected automatically by default.

When the mobile station 1 is within the domestic service area and "20020" ("200" serving as the country identifier MCC) is the mobile communication network identifier PLMN identity, the information holding unit 32 shown in FIG. 3A holds at least the country identifier MCC in the memory 110 shown in FIG. 13.

On the other hand, when the mobile station 1 is within a foreign service area and "FFFFF" ("FFF" serving as the country identifier MCC), for example, is the mobile communication network identifier PLMN identity, the information holding unit 32 holds at least the country identifier MCC in the memory 110.

When the country of the service area in which the mobile station 1 is located and the service area carrier are known, as in the carrier selection case described above, the mobile communication network identifier PLMN identity is held specifically in the memory 110 in accordance with this known information. When it is sufficient to determine between "domestic" and "foreign", all foreign countries are held as "FFFFF".

The information holding unit 32 also holds "transmission permission information". This "transmission permission information" is recorded when permission is given for client information (user ID, roaming information, and so on) to be provided to the content provider server 4 outside of the mobile communication network.

The mobile station 1 may move to an area in which electromagnetic waves cannot be received, or the wireless line may be impaired.

In such cases, the procedure for executing the service area determination function need not be started anew when a session is restarted after being cut since the mobile communication network identifier PLMN identity or the country identifier MCC is held. As a result, the time required to restart a session is reduced.

The application unit 33 realizes in a Web browser application a function for providing notification of the service area in which the mobile station 1 is located.

When content is requested of the content provider server 4, a region header including at least the country identifier held in the information holding unit 32 is added to the header area of the HTTP request, whereupon the request is relayed to the content provider server 4.

Next, referring to FIG. 3B, the internal processing of the mobile station 1 in phase 2 will be described.

34 denotes a communication processing unit, 35 denotes an information holding unit, and 36 denotes an application unit.

Note that the hardware configuration of the mobile station 1 is based on the configuration shown in FIG. 13.

The communication processing unit 34 comprises a notification information reception function and the function for determining the service area of the mobile station 1.

The notification information reception function is a function for receiving notification information from the network side relating to the network system.

More specifically, when the mobile station 1 is within the service area of a base station BS 5, the notification information reception function receives notification information relating to the system of the domestic mobile communication network 2 providing this service area. When the mobile station 1 is within the service area of a base station BS 8, the notification information reception function receives notification information relating to the system of the foreign mobile communication network 3 providing this service area.

The mobile communication network identifier PLMN identity (country identifier MCC+carrier identifier MNC) described above with reference to FIG. 2 may be used as the notification information, for example.

The mobile communication network identifier PLMN identity is included conventionally as telephone system information in system information blocks SIB that are transmitted from the base stations BS 5, 8 to the mobile station 1. However, in the past the mobile station 1 has not used the mobile communication network identifier PLMN identity, which is received by a lower layer protocol, in the upper application layer (HTTP layer).

The function for determining the service area in which the mobile station 1 is located obtains the mobile communication network identifier PLMN identity included in the notification information received by the notification information reception function.

The information holding unit 35 shown in FIG. 3B holds at least the country identifier MCC of the mobile communication network identifier PLMN identity.

When the mobile station 1 is within the domestic service area, at least the country identifier "200" of the mobile communication network identifier PLMN identity "20020" (in which "200" serves as the country identifier MCC) is held in the memory 110 shown in FIG. 13.

On the other hand, when the mobile station 1 is within a foreign service area, at least the country identifier MCC of the mobile communication network identifier PLMN identity comprising the country identifier MCC and the corresponding carrier identifier of the foreign service area is held in the memory 110.

Similarly to phase 1, the information holding unit 35 also holds "transmission permission information".

The application unit 36 realizes a function for providing notification of the service area in which the mobile station 1 is located, similarly to phase 1.

Likewise in phase 2, when the mobile station 1 is within the foreign service area, the country can be specified by the country identifier rather than simply by "foreign".

Hence, the content provider 4 can alter the form of the service for each country of the service area in which the mobile station 1 is located.

For example, it is possible to respond to cases in which a copyright holder permits content distribution to the mobile station 1 when located in a certain country, but prohibits content distribution to the mobile station 1 when located in another country.

Alternatively, it is possible to respond to a case in which the reproduction rights and public transmission rights of the content belong to a different company in each country such that the royalty payment destination varies according to the country.

Note that the processing method performed on the content provider server 4 side in phase 1 may also be followed in phase 2. In this case, it is sufficient to determine between "domestic" and "foreign", and therefore all foreign countries may be set as "FFFFF", similarly to phase 1.

Furthermore, in phase 2 both "domestic" and "foreign" include the carrier identifier MNC, and therefore the services provided by the content provider can be varied according to the carrier.

The carrier identifier MNC is effective when a large country such as the U.S.A. must be divided into service areas of a plurality of carriers on the content provider side.

Figure 4:
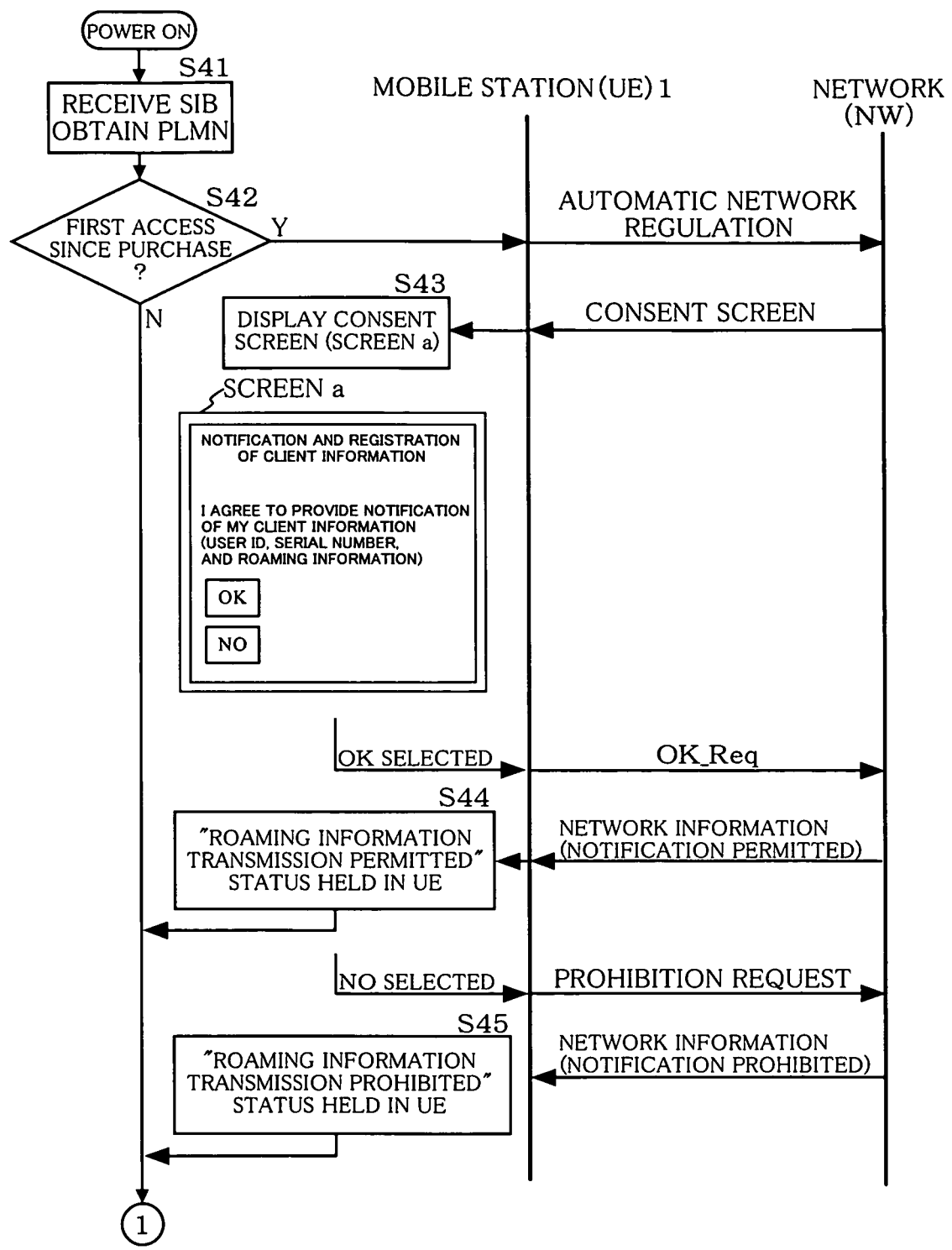
FIG. 4 is a first illustrative view showing an example of an operation of a mobile station having a phase 2 constitution.

FIG. 4 is a first illustrative view showing an example of an operation of the mobile station 1 having the phase 2 constitution.

The mobile station 1 is activated by switching a power source ON.

In S41, the mobile station 1 receives an SIB (System Information Block) from the base station BS 5 or the base station BS 8, and obtains the mobile communication network identifier PLMN identity included in the SIB.

In S42, a determination is made as to whether or not the current access is the first following purchase of the mobile station. If so, a protocol for obtaining permission to notify the content provider server 4 of the client information is begun.

An automatic network regulation instruction is then transmitted from the mobile station (UE) 1 side to the network (NW) side, and the display data of a "consent screen" (screen a) are transmitted from the network side.

In S43, the consent screen shown in "screen a" is displayed on the display unit 107 (FIG. 13) of the mobile station 1. When the user agrees to notify the content provider 4 of the client information, including roaming information, by selecting an "OK" button, an OK request is transmitted to the network.

On the other hand, if the user selects a "NO" button such that consent is not given, a denial request is transmitted to the network.

In either case, a response is transmitted from the network side. Information indicating "notification permitted" or "notification prohibited" is included in the response, and in accordance with the response, a status indicating either "roaming information transmission permitted" or "roaming information transmission prohibited" is held in the information holding unit 35, shown in FIG. 3B, on the mobile station 1 side.

Note that in the illustrated example, permission is requested collectively for notification of the user ID, serial number, and roaming information, but permission may be requested individually for notification of the roaming information.

Figure 5:
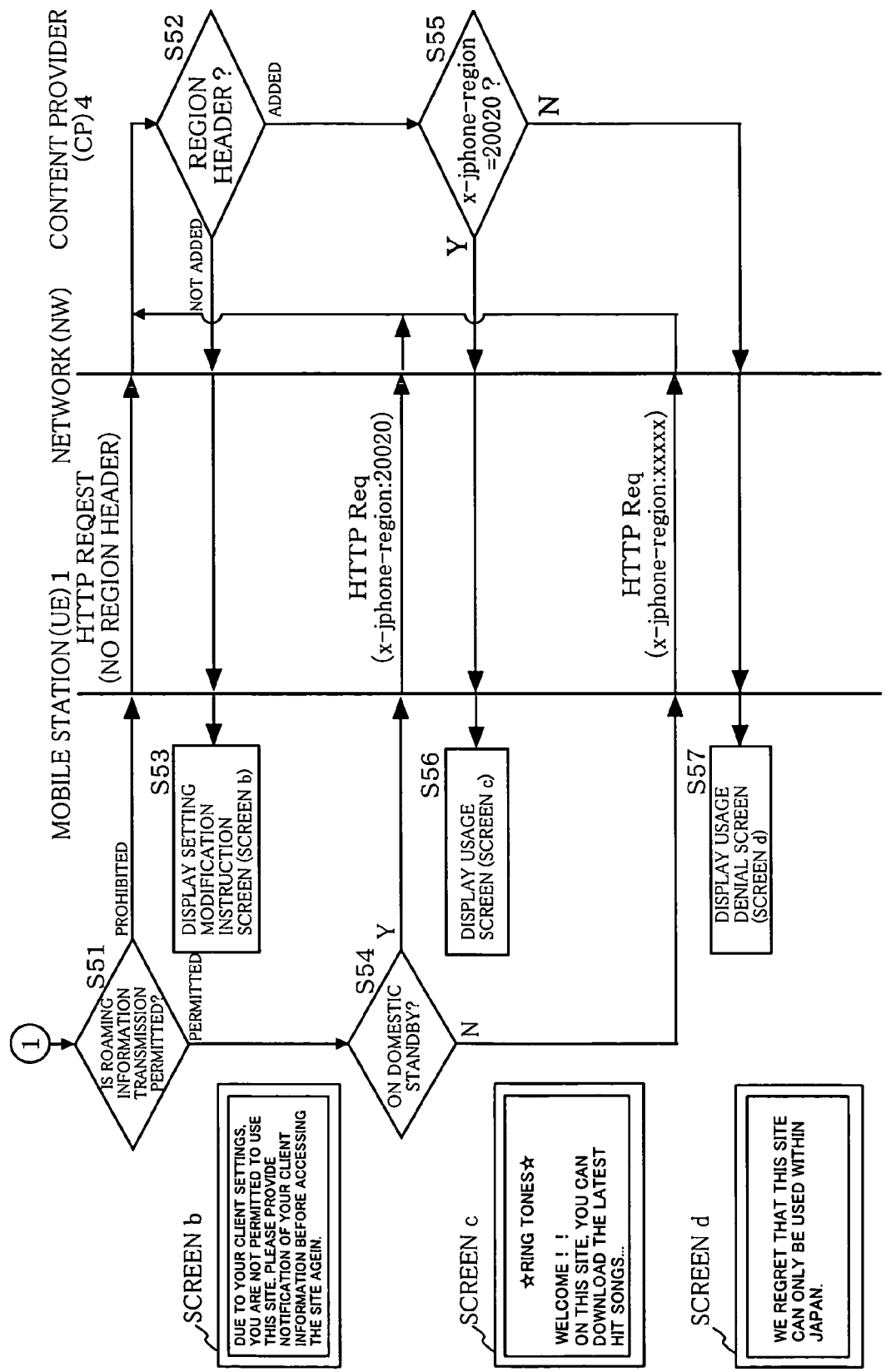
FIG. 5 is a second illustrative view showing an example of an operation of a mobile station having a phase 2 constitution.

FIG. 5 is a second illustrative view showing an example of an operation of the mobile station 1 having the phase 2 constitution.

Following the end of the processing shown in the flowchart of FIG. 4, processing for requesting content is performed from the mobile station 1 side to the content provider server 4.

In S51, a determination is made as to whether or not "roaming information transmission permitted" is held in the information holding unit 35.

When "roaming information prohibited" is held, an HTTP request having no region header is transmitted over the network to the content provider server 4.

A determination is then made on the content provider server 4 side as to whether or not a region header is included in the HTTP request.

In this case, no region header is included, and therefore a response indicating the absence of the region header is returned to the mobile station 1 over the network. In S53, a setting modification instruction screen, shown in "screen b", is displayed on the mobile station 1 to notify the mobile station 1 that the site (Web page) of the content provider server 4 accessed by the mobile station 1 cannot be used.

On the other hand, when "roaming information transmission permitted" is stored in the information holding unit 35 of the mobile station 1 in S51, the HTTP request is transmitted over the network to the content provider server 4 in S54 according to whether or not the mobile station 1 is in a state of domestic standby (within Japan).

The step S51 indicates the holding information that is held in the information holding unit 35. In actuality, the mobile communication network identifier PLMN identity (at least the country identifier MCC) held in the information holding unit 35 is written into the region header and transmitted over the network to the content provider server 4.

If the mobile station 1 is determined to be on domestic standby, the HTTP request is transmitted with "20020" specified in the region header, and if the mobile station 1 is determined to be on standby abroad, the HTTP request is transmitted with "xxxxx" (i.e. a different code depending on the country and carrier) specified in the region header. If it is necessary to differentiate simply between "domestic" and "foreign", either "20020" or "FFFFF" is held.

Once it has been determined on the content provider server 4 side that the region header is present in S52, a determination is made in S55 as to whether or not the region header specifies "20020", and if so, data for displaying a usage screen, an example of which is shown in "screen c", is transmitted to the mobile station 1 side.

In other words, the top page (Web page) of the Web site of the content provider 4 is displayed.

The subsequent processing has been omitted from the drawings, but the user selects music content such as a desired ring tone, performs payment processing, and downloads the music content.

On the other hand, when "20020" is not specified in the region header in S55, data for a usage denial display screen, shown in "screen d", is transmitted to the mobile station 1 side in S57.

In other words, notification is provided that the site of the accessed content provider server 4 cannot be used from abroad.

In the above description, the content provider server 4 is notified of the mobile communication network identifier PLMN identity (at least the country identifier MCC) on the mobile station 1 side.

In contrast, an embodiment may be employed in which the mobile station 1 itself has a conventional constitution and the function for notifying the content provider server 4 of the mobile communication network identifier PLMN identity (at least the country identifier MCC) is added to the mobile communication network side.

FIG. 6 is an overall constitutional diagram of a system using an international roaming-capable mobile communication network according to another embodiment of the present invention.

Identical parts to those illustrated in FIGS. 1 and 14 have been allocated identical reference symbols.

The mobile station 61 is the conventional international roaming-capable mobile station shown in FIGS. 13, 14. Functions not possessed by the gateway packet switching node GGSN 6 and gateway G/W 10 shown in FIG. 1 are added to a gateway packet switching node GGSN 62 and a gateway G/W 63, respectively.

The domestic mobile communication network 2, foreign mobile communication network 3, and gateway G/W 63 correspond to an international roaming-capable mobile communication network system.

By relaying a request for a service, transmitted by the international roaming-capable mobile station 61, to the content provider server 4, the content provider server 4 side is caused to provide the service.

This international roaming-capable mobile communication network system comprises a service area determination function for determining the service area in which the mobile station 61 is located, and a service area notification function for causing the form in which the service requested by the mobile station 61 is provided to be controlled in accordance with the country of the determined service area by notifying the content provider server 4 of the mobile communication network identifier PLMN identity (at least the country identifier MCC) indicating the determined service area.

Various networks are constructed according to the node of the international roaming-capable mobile communication network system which possesses the service area determination function and the service area notification function.

Below, a case in which the service area determination function and service area notification function are realized in the gateway G/W 63, which is disposed domestically (in the country of the home network), will be described.

Similarly to a conventional case, when the mobile station 61 is located in the domestic mobile communication network 2, the mobile packet switching node SGSN 6 receives a connection request from the mobile station 61. When the mobile station 61 is located in the foreign mobile communication network 3, the mobile packet switching node SGSN 9 receives the connection request from the mobile station 61.

Also similarly to a conventional case, the gateway packet switching node GGSN 62 comprises a switching node IP address acquisition function for obtaining the IP address of the mobile packet switching node SGSN 6 or SGSN 9 which receives the connection request from the mobile station 61.

Unlike a conventional case, in this embodiment the gateway packet switching node GGSN 62 notifies the gateway G/W 63 of the IP address of the mobile packet switching node SGSN 6 and the IP address of the mobile packet switching node SGSN 9.

The gateway G/W 63 also comprises the service area determination function. In other words, the gateway G/W 63 determines the mobile communication network identifier PLMN identity (at least the country identifier MCC), indicating the service area of the network to which the mobile packet switching node belongs, in accordance with the IP address of the mobile packet switching node obtained by the gateway packet switching node GGSN 62, and considers the determined service area as the service area in which the mobile station 61 is located.

When the request for service transmitted from the mobile station 61 side is relayed to the content provider server 4, the content provider server 4 is notified of the service area determined by the service area determination function, and hence the service requested by the mobile station 61 is provided in a form that is controlled in accordance with the country of the service area.

More specifically, a region header describing the mobile communication network identifier PLMN identity (at least the country identifier MCC) which indicates the service area is added to the header area of the request, whereupon the request is relayed to the content provider server 4.

The aforementioned service area notification function of the gateway G/W 63 is similar to the service area notification function of the mobile station 1 having the phase 1 or phase 2 constitution, as described above with reference to FIG. 3.

Hence, even when the configuration of the international roaming-capable mobile communication network system is limited to a configuration within the home network country, the gateway G/W 63 can be provided with service area determining means and service area notifying means, for example.

Figure 7:
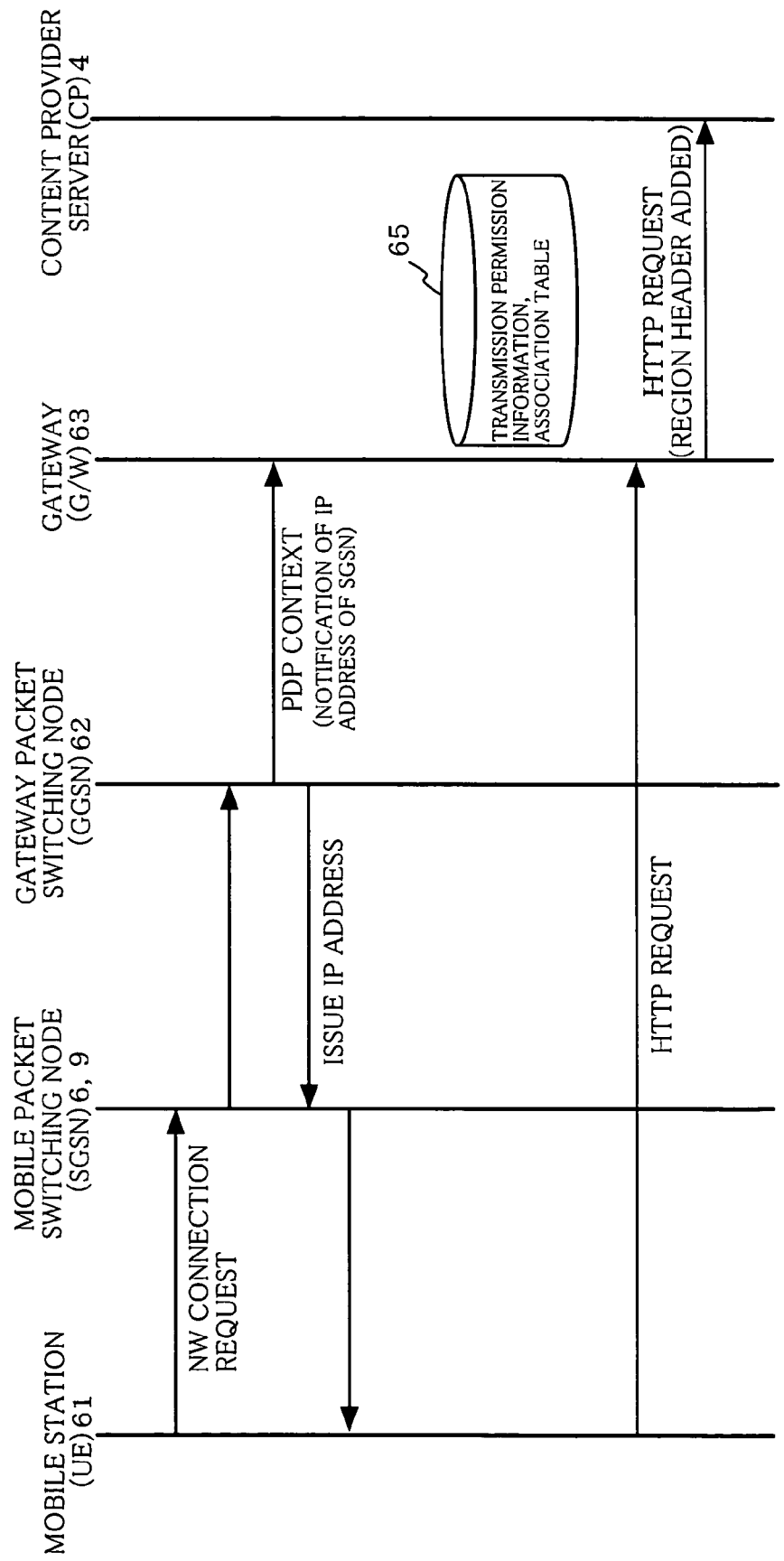
FIG. 7 is a signal sequence diagram illustrating a control procedure performed in the embodiment shown in FIG. 6.

FIG. 7 is a signal sequence diagram illustrating a control procedure of the embodiment shown in FIG. 6.

A network connection request is transmitted from the mobile station 61 to the gateway packet switching node GGSN 62 via the base station BS 5 and mobile packet switching node SGSN 6 of the domestic mobile communication network 2, or via the base station BS 8 and mobile packet switching node 9 of the foreign mobile communication network 3.

The gateway packet switching node GGSN 62 allocates an IP address to the mobile station 61. The IP address is issued to the mobile station 61 in the opposite direction to the path taken by the network connection request.

The gateway packet switching node GGSN 62 also notifies the gateway G/W 63 of the IP address of the mobile packet switching node SGSN 6 or SGSN 9 to which the network connection request was relayed, in the form of a PDP context (Packet Data Protocol Context).

However, the notified IP address of the SGSN 6, 9 is not a mobile communication network identifier PLMN identity (at least the country identifier MCC) indicating the service area.

Hence, a table associating the IP address of the mobile packet switching node SGSN 6 or SGSN 9 with a mobile communication network identifier PLMN identity (at least a country identifier MCC) indicating the service area provided by the network to which the mobile packet switching node SGSN 6 or SGSN 9 belongs is stored in a storage apparatus 65 of the gateway G/W 63.

For example, associations are made between an IP address xxx.xxx.AAA.xxx and a certain country (the country identifier MCC), and an IP address xxx.xxx.BBB.xxx and another certain country (country identifier MCC).

If it is sufficient to differentiate between "domestic" and "foreign", then the mobile communication network identifier PLMN identity indicating the foreign service area may be set to "FFFFF".

As a result, when notification is provided of the IP address of one of the mobile packet switching nodes SGSN 6 and SGSN 9, the service area provided by the mobile communication network to which the mobile packet switching node SGSN 6 or SGSN 9 belongs is determined by referring to this association table. Further, at least the country identifier MCC of the service area is stored in the storage apparatus 65 to indicate the service area in which the mobile station 61 is located. Needless to say, the mobile communication network identifier PLMN identity may also be stored in the storage apparatus 65.

Further, although not shown in the drawing, a determination is made in advance as to whether or not the region header may be added to the HTTP request. In other words, similar processing to that shown in FIGS. 4 and 5 is performed in advance using an authentication screen to confirm whether roaming information transmission is permitted or prohibited.

"Roaming information transmission permitted" or "roaming information transmission prohibited" (i.e. permission information) is recorded in the gateway G/WV 63 according to whether or not the user consents to notification of his/her client information, and this permission information is stored in the storage apparatus 65 in association with the subscriber number (Mobile Subscriber Number, strictly MSISDN) of each mobile station 61.

The content provider server 4 determines whether the mobile station 61 is within the service area of the domestic mobile communication network 2 or the service area of the foreign mobile communication network 3 according to at least the country identifier MCC of the service area, which is written in the region header.

In the above description, the association table is stored in the storage apparatus 65 of the gateway G/W 63. Instead of this constitution, a similar association table may be provided in the mobile packet switching node SGSN 6 or SGSN 9 of the core network, the gateway packet switching node GGSN 62, or another location and converted into the mobile communication network identifier PLMN identity (at least the country identifier MCC) indicating the service area, whereupon the region header is added to the HTTP header and relayed.

In another embodiment, the IP address of the mobile packet switching node SGSN 6 or SGSN 9 may be written into the region header as is and notified to the content provider server 4.

In this case, the association table of IP addresses and service areas, described above as being stored in the storage apparatus 65 of the gateway G/W 63, must be placed on the open site content provider server 4 side.

In the description provided above with reference to FIGS. 6 and 7, an international roaming-capable mobile station 61 which is similar to a conventional mobile station is used, and the IP address of the mobile packet switching node SGSN 6 or SGSN 9 which receives a connection request from the mobile station 61 is obtained in the gateway G/W 63 on the mobile communication network side. The service area of the mobile station 61 is determined in accordance with the obtained IP address by referring to the association table, whereupon the determined service area is written into the region header and notified to the content provider server 4.

In an alternative embodiment, the IP address of the mobile packet switching node SGSN 6 or SGSN 9 is written into the region header as is and notified to the content provider server 4 such that the service area of the mobile station 61 is determined on the content provider server 4 side.

Below, an embodiment for determining the service area on the mobile communication network side using a different method will be described.

Figure 8:
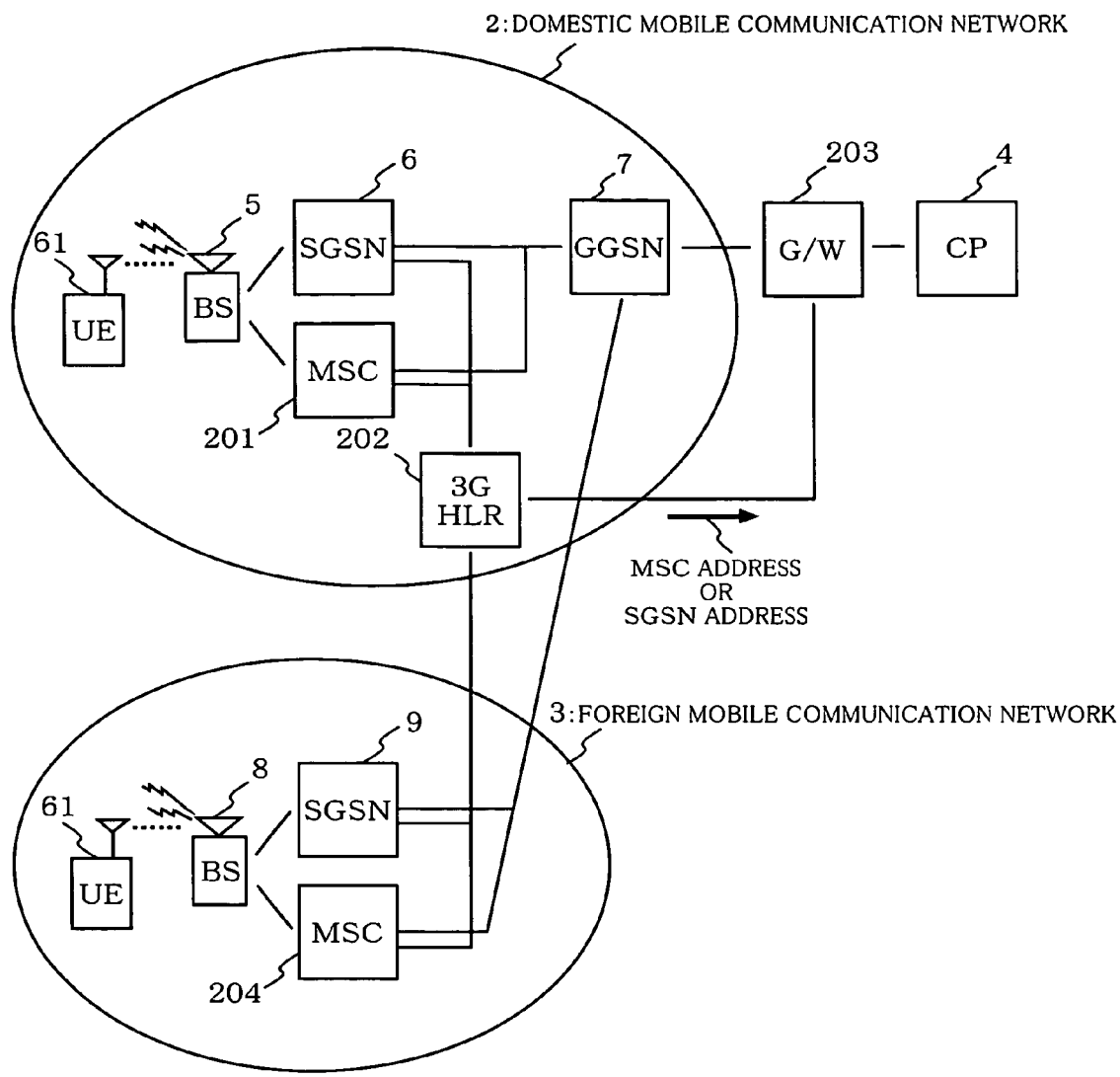
FIG. 8 is a partial constitutional diagram of a system using an international roaming-capable mobile communication network according to another embodiment of the present invention.

FIG. 8 is a partial constitutional diagram of a system using an international roaming-capable mobile communication network according to another embodiment of the present invention.

Identical parts to those illustrated in FIGS. 1 and 6 have been allocated identical reference symbols. Although omitted from FIGS. 1 and 6, in a mobile communication network providing a voice communication service and a network service, a mobile communication switching node MSC (Mobile Switching Center) 201 is provided between the base station BS 5 and the gateway packet switching node GGSN 7, and a mobile communication switching node MSC 204 is provided between the base station BS 8 and the gateway packet switching node GGSN 7. Note that in 3GPP, the base station is referred to as Node-B.

The functions of the gateway packet switching node GGSN 7 are identical to those of the conventional node illustrated in FIG. 1.

Similarly to a conventional case, when power is supplied, the mobile station 61, located in the domestic mobile communication network 2, performs position registration with the mobile communication switching node MSC 201 via the base station 5, and also performs position registration with the mobile packet switching node SGSN 6 via the base station 5.

Likewise when located in the foreign mobile communication network 3, the mobile station 61 performs position registration with the mobile communication switching node MSC 204 and the mobile packet switching node SGSN 9 via the base station 8.

When the mobile station 61 is located in the domestic mobile communication network 2, the mobile packet switching node SGSN 6 receives the connection request from the mobile station 61. On the other hand, when the mobile station 61 is located in the foreign mobile communication network 3, the mobile packet switching node SGSN 9 receives the connection request from the mobile station 61.

202 denotes a third generation (3G) home location register 3GHLR (Home Location Register) provided in the home network (in the illustrated example, the domestic mobile communication network 2) to which the user of the mobile station 61 subscribes. The 3GHLR 202 manages settings such as an IMSI (International Mobile Subscriber Identity) and position registration, exchange-system data setting, a forwarding number, a "VLR (Vistor Location Register) address", "MSC address", and "SGSN address" at the time of the latest position registration, and so on in association with the subscriber number (Mobile Subscriber ISDN).

The mobile communication switching node MSC or mobile packet switching node SGSN is dispersed over a plurality of areas within the domestic mobile communication network 2 or foreign mobile communication network 3.

The "MSC address" of the mobile communication switching node MSC and the "SGSN address" of the mobile packet switching node SGSN, in relation to which the mobile station 61 requests position registration, are managed individually by the 3G home location register 3GHLR 202 in compliance with TS23 of 3GPP and CCITT (ITU-T) recommendation E.164.

The "MSC address" is information specifying the mobile communication switching node MSC 201 or MSC 204 which receives the position registration request from the mobile station 61, and includes a "country number CC (Country Code)" in its upper digits, identifying the country of the service area in which the mobile communication switching node MSC is located, and a "national destination code".

Meanwhile, the "SGSN address" is information specifying the mobile packet switching node SGSN 6 or SGSN 9 which receives the position registration request from the mobile station 61, and includes a "country number CC (Country Code)" in its upper digits, identifying the country of the service area in which the mobile packet switching node SGSN is located, and a "national destination code". In certain cases, the two service areas match completely, while in other cases, one of the two is larger than the other. Regardless, the MSC address and SGSN address are considered as data relating to the service area in which the mobile station 61 is located.

The country can be specified by the "country number CC", while the carrier (operator) can be specified by the "national destination code NDC". The "national destination code NDC" is published by the GSM Association.

Of the "mobile communication network identifier PLMN identity" described above, the "country identifier MCC" is obtained from the "country number CC", while the "carrier (operator) identifier MNC" is obtained from the "national destination code NDC".

The international roaming-capable mobile communication network system also comprises a function for determining the service area in which the mobile station 61 is located, and a notification function for causing the form in which the service requested by the mobile station 61 is provided to be controlled in accordance with at least the country of the determined service area by notifying the content provider server 4 of the mobile communication network identifier PLMN identity (at least the country identifier MCC), "MSC address", or "SGSN address" indicating the determined service area.

Various networks are constructed according to the node of the international roaming-capable mobile communication network system which possesses the determination function and notification function.

Below, a case in which the determination function and notification function are realized in a gateway G/W 203, which is disposed domestically (in the country of the home network), will be described.

Conventionally, the "MSC address" and "SGSN address" are stored in the 3G home location register 3GHLR 202, but a route for requesting and reading the "MSC address" and "SGSN address" from the G/W 203 is not provided in the 3GHLR 202.

In this embodiment, a route enabling the gateway G/W 203 to access the 3GHLR 202 is provided, and the "MSC address" (at least the "country number CC") of the mobile communication switching node MSC which receives the position registration request from the mobile station 61, or the "SGSN address" (at least the "country number CC") of the mobile packet switching node SGSN which receives the position registration request from the mobile station 61, is obtained from the 3G home location register 3GHLR 202 as the location information of the mobile station 61.

The gateway G/W 203 determines the service area (at least the country) in which the mobile station 61 is located on the basis of the obtained data.

The gateway G/W 203 then uses the determination result to create a region header, and transfers an HTTP request with the region header added thereto to the content provider server CP 4. When the mobile station 61 is located in the foreign mobile communication network 3, all mobile communication network identifier PLMN identities may be set as "FFFFF" and all country identifiers MCC as "FFF".

Figure 9:
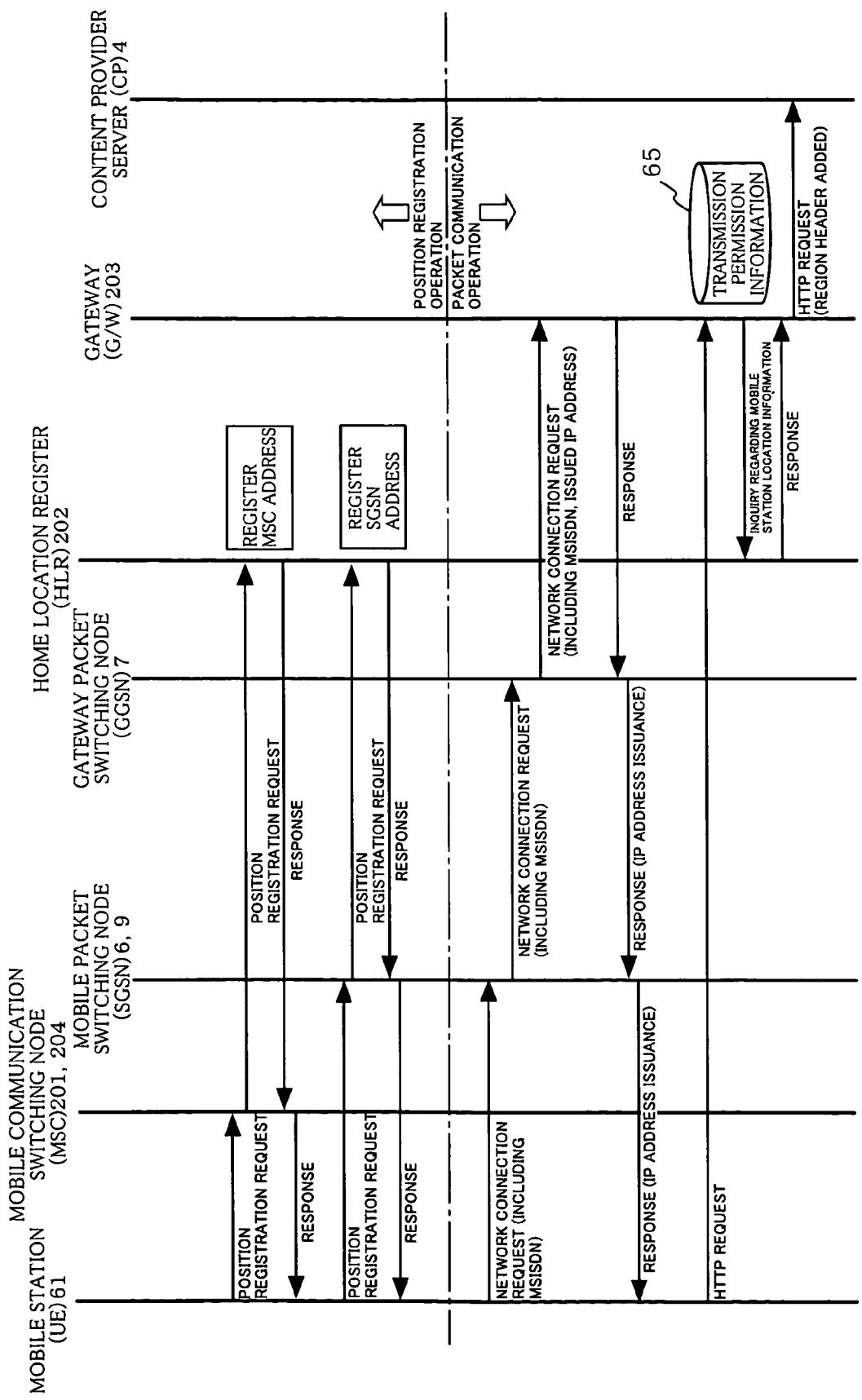
FIG. 9 is a signal sequence diagram illustrating a control procedure performed in the embodiment shown in FIG. 8.

FIG. 9 is a signal sequence diagram illustrating a control procedure performed in the embodiment shown in FIG. 8.

Similarly to a conventional case, when a power supply or the like is introduced, the mobile station 61 issues a position registration request to the mobile communication switching node MSC 201 via the base station 5, or to the mobile communication switching node MSC 204 via the base station 8, in accordance with whether the mobile station 61 is located in the service area of the domestic mobile communication network 2 or the service area of the foreign mobile communication network 3.

The mobile communication switching node MSC 201 or MSC 204 issues a position registration request to the 3G home location register 3GHLR 202, and notifies the mobile station 61 of a response to the position registration request.

If position registration is successful, the "MSC address" of the mobile communication switching node MSC 201 or MSC 204 which receives the position registration request from the mobile station 61 is recorded in the 3G home location register 3GHLR 202.

The mobile station 61 also issues a position registration request to the mobile packet switching node SGSN 6 via the base station 5, or to the mobile packet switching node SGSN 9 via the base station 8, according to whether the mobile station 61 is located in the service area of the domestic mobile communication network 2 or the service area of the foreign mobile communication network 3, and if position registration is successful, the "SGSN address" of the mobile packet switching node SGSN 6 or SGSN 9 which receives the position registration request from the mobile station 61 is recorded in the 3G home location register 3GHLR 202.

The position registration processing described above is similar to that of a conventional case.

When the mobile station 61 is located in the domestic mobile communication network 2 and a packet communication operation is begun to enable the subscriber to utilize a network service, a network connection request is transmitted by the mobile station 61 to the gateway packet switching node GGSN 7 via the base station BS 5 and the mobile packet switching node SGSN 6. On the other hand, when a packet communication operation is begun while the mobile station 61 is located in the foreign mobile communication network 3, a network connection request is transmitted to the gateway packet switching node GGSN 7 via the base station BS 8 and the mobile packet switching node SGSN 9. The subscriber number (MSISDN) of the mobile station 61 is included in the network connection request.

The gateway packet switching node GGSN 7 transmits the network connection request to the gateway G/W 203, including therein a planned IP address to be issued to the mobile station 61 as well as the subscriber number (MSISDN) of the mobile station 61. Thus the gateway G/W 203 learns and stores the relationship between the subscriber number (MSISDN) of the mobile station 61 and the planned IP address to be issued to the mobile station 61.

When a response to the network connection request is returned by the gateway G/W 203, the gateway packet switching node GGSN 7 issues the mobile station 61 with the IP address to be applied to the mobile station 61 via the mobile packet switching node SGSN 6 or SGSN 9 which received the network connection request from the mobile station 61.

Likewise in this embodiment, the gateway packet switching node GGSN 7 determines in advance whether or not the region header may be added to the HTTP request. In other words, similar processing to that shown in FIGS. 4 and 5 is performed in advance using an authentication screen to confirm whether roaming information transmission is permitted or prohibited.

"Roaming information transmission permitted" or "roaming information transmission prohibited" (i.e. permission information) is stored in the storage apparatus 65 of the gateway G/W 203 according to whether or not the user consents to notification of his/her client information, in association with the subscriber number (MSISDN) of each mobile station 61.

A check as to whether or not the permission information relating to the subscriber number of the mobile station 61, stored in the storage apparatus 65, indicates "roaming information transmission permitted" is performed when the HTTP is transmitted to the gateway G/W 203 from the mobile station 61 side.

The gateway G/W 203 knows the IP address of the HTTP request transmission source, or in other words the IP address of the mobile station 61, and therefore learns the subscriber telephone number (MSISDN) of the mobile station 61 which transmits the HTTP request on the basis of the pre-stored relationship between the subscriber number (MSISDN) of the mobile station 61 and the planned IP address to be issued to the mobile station 61. The gateway G/W 203 searches the storage apparatus 65 using the subscriber telephone number (MSISDN) as a retrieval key, and if "roaming information transmission permitted" is extracted, the gateway G/W 203 requests the location information of the mobile station 61 from the 3G home location register 3GHLR 202 using the subscriber telephone number (MSISDN) of the mobile station 61 as a retrieval key.

The location information of the mobile station 61 is constituted by the "MSC address" or "SGSN address" (at least the "country number CC") described above.

Note that the "permission information" may be stored in the 3G home location register 3GHLR 202, for example, rather than the gateway G/W 203 such that the determination as to whether or not the permission information corresponds to "roaming information transmission permitted" is performed in the 3G home location register 3GHLR 202.

The visitor location register VLR is provided for each mobile communication switching node MSC. The information stored in the visitor location register VLR is basically copied to the 3G home location register 3GHLR 202.

It is extremely inefficient to retrieve the location information of the mobile station 61 from all of the visitor location registers VLR in the domestic mobile communication network 2 and foreign mobile communication network 3, and therefore the location information of the mobile station 61 is requested from the 3G home location register 3GHLR 202.

Having received the location information inquiry from the gateway G/W 203, the 3G home location register 3GHLR 202 notifies the gateway G/W 203 of the "MSC address" of the mobile communication switching node MSC or the "SGSN address" of the mobile packet switching node SGSN, in accordance with the node which receives the position registration request from the mobile station 61.

The gateway G/W 203 adds to the HTTP request a region header describing the "mobile communication network identifier PLMN identity (at least the country identifier MCC)", the "MSC address (at least the country number CC)", or the "SGSN address (at least the country number CC)" as data indicating the service area in which the mobile station 61 is located, and then relays the HTTP request to the content provider server 4.

Note that when it is sufficient to differentiate simply between "domestic" and "foreign", a country code of "FFF", for example, may be used to specify a foreign service area.

In another embodiment, the "MSC address" or "SGSN address" may be written into the region header as is and notified to the content provider server 4. In this case, at least the country of the service area in which the mobile station 61 is located must be identified on the open site content provider server 4 side. Measures may also be taken to enable identification of the carrier of the service area.

In the description provided above with reference to FIGS. 6 and 7, the gateway G/W 63 obtains the IP address of the mobile packet switching node SGSN 6 or SGSN 9 which receives the connection request from the mobile station 61 via the gateway packet switching node GGSN 62.

Instead, the "SGSN address" of the mobile packet switching node SGSN 6 or SGSN 9 which receives the connection request from the mobile station 61 may be obtained via the gateway packet switching node GGSN 62. Alternatively, the "MSC address" of the mobile communication switching node MSC 201 or MSC 204 which receives the position registration request from the mobile station 61 may be obtained via the gateway packet switching node GGSN 62.

Further, in the description provided above with reference to FIGS. 8 and 9, the gateway G/W 203 obtains the "MSC address" of the mobile communication switching node which receives the position registration request from the mobile station 61, or the "SGSN address" of the mobile packet switching node SGSN which receives the position registration request from the mobile station 61, via the 3G home location register 3GHLR.

Instead, the IP address of the mobile packet switching node SGSN 6 or SGSN 9 which receives the connection request from the mobile station 61 may be stored in the 3G home location register 3GHLR, and the gateway G/W 203 may obtain the IP address from the 3G home location register 3GHLR.

A region header may also be added when an Internet connection is performed via a voice switching node MSC.

The HTTP request from the mobile station 61 is notified to a gateway G/W via the voice switching node MSC, and hence the gateway G/W, having received the HTTP request, obtains the location information from the home location register HLR on the basis of the MSISDN, obtained by the lower layer. The region header is added on the basis of the location information. Note, however, that in this case, the gateway G/W is a completely different node to the gateways G/W 10, 63, 203 described heretofore.

Figure 10:
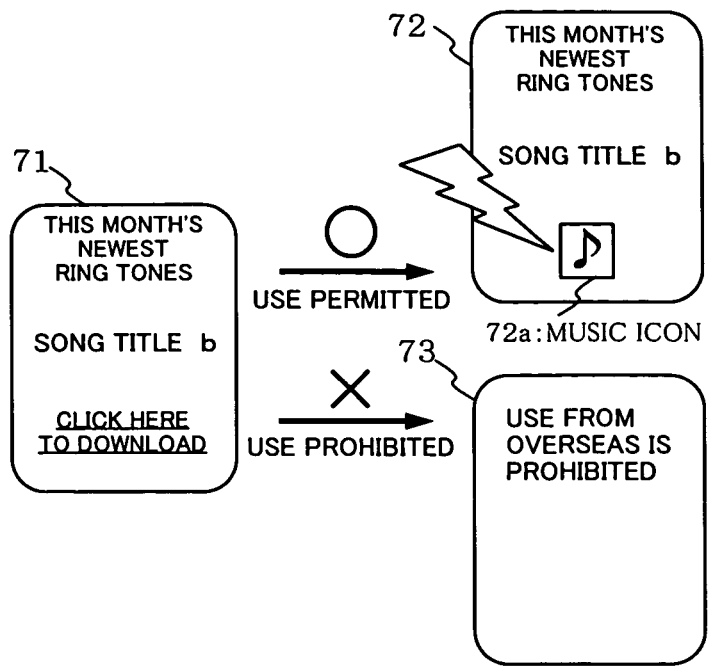
FIG. 10 is an illustrative view showing an example of a case in which each embodiment of the present invention is used for song distribution.

FIG. 10 is an illustrative view showing an example of a case in which each embodiment of the present invention is used in a song distribution service.

A case in which restrictions are placed on music downloading from abroad will be described.

Once a specific song title (song title b) has been specified, a download request is issued, and a response indicating "use permitted" or "use prohibited" is returned.

The display unit 107 of the mobile station 1 displays a display screen 71 when the "song title b" has been selected. URI information indicating the location of a ring tone corresponding to the "song title b" is transmitted by the content provider server 4 in the form of an HTTP response.

The mobile station 1 transmits a request having an added region header which specifies the URI to the content provider server 4.

When use is permitted in accordance with the country of the service area in which the mobile station is located, this information being described in the region header, the display unit 107 displays a display screen 72, and when the user selects a music icon 72a, the ring tone corresponding to the "song title b" is downloaded to a predetermined storage area of the memory 110. Payment processing is performed once downloading is complete.

On the other hand, when use is not permitted, the display unit 107 displays a display screen 73, notifying the user that the music distribution service cannot be used since use from overseas is prohibited (i.e. when the mobile station 1 is within the foreign service area).

Figure 11:
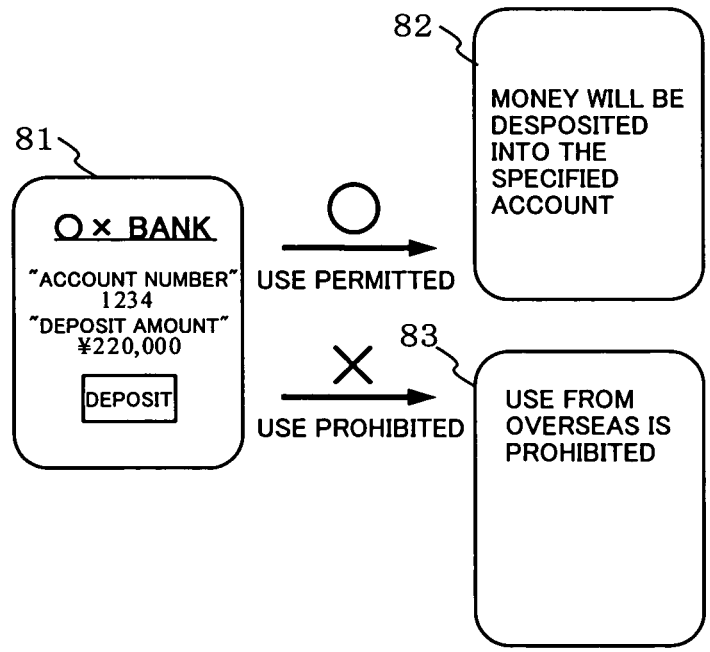
FIG. 11 is an illustrative view showing an example of a case in which each embodiment of the present invention is used for network banking.

FIG. 11 is an illustrative view showing an example of a case in which each embodiment of the present invention is used for network banking. A case in which restrictions are placed on deposit processing from overseas in consideration of time differences and the like will be described.

A display screen 81 is displayed when the user accesses an account transfer page of a bank and inputs an "account number" and a "deposit amount".

When use is permitted in accordance with the country of the service area in which the mobile station is located, this information being described in the region header, the display unit 107 displays a display screen 82, notifying the user that money will be deposited into the specified account.

When use is not permitted, the display unit 107 displays a display screen 83, notifying the user than the network banking service cannot be used since use from overseas is prohibited.

Figure 12:
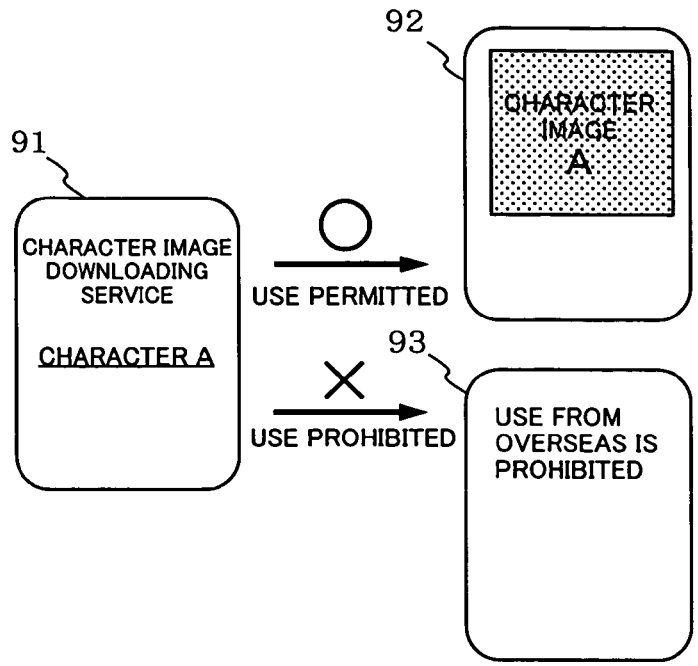
FIG. 12 is an illustrative view showing an example of a case in which each embodiment of the present invention is used for character image distribution.

FIG. 12 is an illustrative view showing an example of a case in which each embodiment of the present invention is used for the distribution of character images such as animations.

A case in which downloading to a mobile station overseas is prohibited unless the permission of the copyright holder is received.

A display screen 91 is displayed when the user selects a specific character screen A on a character image downloading site.

When use is permitted in accordance with the country of the service area in which the mobile station is located, this information being described in the region header, the display unit 107 displays a display screen 92, and character image A is downloaded to the mobile station 1 and displayed.

When use is not permitted, the display unit 107 displays a display screen 93, notifying the user than the character image distribution service cannot be used since use from overseas is prohibited.

In the above description, it is assumed that the content provider server 4 is located in the same country as the home network.

However, the content provider server 4 may be located in any country, as may the office of the content provider.

The carrier operating the mobile communication network server may itself be the server which runs the content service operation, instead of the content provider server 4.

The content provider server 4 may determine the form of the service in advance according to the country of the service area in which the mobile station requesting service is located, taking into consideration the laws, contractual coverage, and so on of each country.

In the above description, cases using the mobile station 1 (FIG. 1) and mobile station 61 (FIG. 6), which are capable of international roaming by means of terminal roaming, were described.

A mobile station that is made capable of international roaming through the insertion of a chip into the mobile station is also included in the international roaming-capable mobile station of the present invention.

Similarly with this type of mobile station, the form of service can be controlled by the server in accordance with the country and so on of the service area in which the mobile station is located, upon reception of a request comprising a region header.

Similarly to the phase 2 mobile station 1 (FIG. 1), the service area of the mobile station may be determined by obtaining notification information from the mobile communication network on the mobile station side, whereupon a request comprising a region header is transmitted to the server.

Furthermore, the service area of the mobile station may be determined on the mobile communication network side in a similar manner to that illustrated in FIG. 6, whereupon the region header is added to the request on the mobile communication network side and the request is transmitted to the server.

The invention claimed is:

1. An international roaming-capable mobile station, comprising:

a service requesting device which transmits a request for a service to a server- and wherein, when the service is permitted, the international roaming-capable mobile station is provided with the service by the server in response to the request transmitted by the service requesting device;

a service area determining device that determines a service area in which the international roaming-capable mobile station is located;

a service area notifying device that causes the form in which the service requested in the request transmitted by the international roaming-capable mobile station is provided to be controlled in accordance with the service area determined by the service area determining device, by notifying the server of the service area using a process of adding data regarding the service area to the request for the service that is transmitted to the server, wherein the service area notifying device is adapted to transmit the request to the server after adding a header describing the service area in which the international roaming-capable mobile station is located to a header area of the request, and wherein the service area in which the international roaming-capable mobile station is located is independent of a location of the server to which the request is being transmitted, wherein the service is received by the international-roaming capable mobile station in a controlled form that is controlled in accordance with the service area as notified to the server in the header area of the request, and wherein the controlled form of the service includes prohibiting the service when a determination is made that the service is prohibited for the service area based on the geographic region of the service area;

the server, which receives the request transmitted by the international roaming-capable mobile station, and controls the controlled form in which the service requested in the received request is provided in accordance with the data regarding the service area in which said international roaming-capable mobile station is located that is provided in the header of the received request; and a carrier setting device that sets a single carrier from among a plurality of carriers in relation to an international roaming-capable mobile communication network system, wherein the service area determining device determines the service area in which the international roaming-capable mobile station is located in accordance with the carrier set by the carrier setting device.

2. The international roaming-capable mobile station according to claim 1, further comprising;

a mobile communication mode setting device that sets a single mobile communication mode from among a plurality of mobile communication modes through a selection operation performed by a user, wherein the service area determining device determines the service area in which the international roaming-capable mobile station is located in accordance with the mobile communication set by the mobile communication mode setting device.

3. The international roaming-capable mobile station according to claim 1, further comprising:

a notification information receiver that receives notification information relating to a mobile communication network system which provides the service area in which the international roaming-capable mobile station is located from a base station located in the service area, wherein the service area determining device determines the service area in which the international roaming-capable mobile station is located from the notification information received by the notification information receiver.

4. The international roaming-capable mobile station according to claim 1, wherein the service area notifying device notifies the server of the service area determined by the service area determining device when said international roaming-capable mobile station transmits the request to the server.

5. The international roaming-capable mobile station according to claim 4, wherein the service area notifying device transmits the request to the server after adding a header describing the service area to a header area of the request.

6. The international roaming-capable mobile station according to claim 1, wherein the service area determining device determines a country of the service area in which the international roaming-capable mobile station is located, and wherein the service area notifying device causes the form in which the service requested in the request transmitted by said international roaming-capable mobile station is provided to be controlled in accordance with the country of the service area determined by the service area determining device, by notifying the server of the country of the service area.

7. The international roaming-capable mobile station according to claim 1, wherein the service area determining device determines a country and a carrier of the service area in which the international roaming-capable mobile station is located, and wherein the service area notifying device causes the form in which the service requested in the request transmitted by the international roaming-capable mobile station is provided to be controlled in accordance with the country and the carrier of the service area determined by the service area determining device, by notifying the server of the country and the carrier of the service area.

8. An international roaming-capable mobile communication network system which causes a server to provide a service by relaying a service request for the service, transmitted by an international roaming-capable mobile station, to the server, comprising:

the international roaming-capable mobile station, wherein the international roaming-capable mobile station includes:

a service requesting device which transmits the service request for the service to the server, and wherein, when the service is permitted, the international roaming-capable mobile station is provided with the service by the server in response to the request transmitted by the service requesting device;

a service area determining device that determines a service area in which the international roaming-capable mobile station is located; and a service area notifying device that causes the server to control the form in which the service requested in the service request is provided in accordance with the service area determined by the service area determining device, by notifying the server of the service area using a process of adding data regarding the service area to the request for the service that is relayed to the server, wherein the service area notifying device is adapted to transmit the request to the server after adding a header describing the service area in which the international roaming-capable mobile station is located to a header area of the request, and wherein the service area in which the international roaming-capable mobile station is located is independent of a location of the server to which the request is being transmitted, wherein the service is received by the international-roaming capable mobile station in a controlled form that is controlled in accordance with the service area as notified to the server in the header area of the request, and wherein the controlled form of the service includes prohibiting the service when a determination is made that the service is prohibited for the service area based on the geographic region of the service area; and the server, which receives the request transmitted by the international roaming-capable mobile station, and controls the controlled form in which the service requested in the received request is provided in accordance with the data regarding the service area in which said international roaming-capable mobile station is located that is provided in the header of the received request; and a carrier setting device that sets a single carrier from among a plurality of carriers in relation to an international roaming-capable mobile communication network system, wherein the service area determining device determines the service area in which the international roaming-capable mobile station is located in accordance with the carrier set by the carrier setting device.

9. The international roaming-capable mobile communication network system according to claim 8, further comprising:
a switching node address obtaining device that obtains an address of a switching node which receives a request from the international roaming-capable mobile station, wherein the service area determining device determines the service area in which the international roaming-capable mobile station is located in accordance with the switching node address obtained by the switching node address obtaining device.

10. The international roaming-capable mobile communication network system according to claim 9, wherein the switching node address is an IP address of a mobile packet switching node which receives the request from the international roaming-capable mobile station.

11. The international roaming-capable mobile communication network system according to claim 9, wherein the switching node address obtaining device obtains the address of the switching node which receives the connection request from the international roaming-capable mobile station from a home location register storing the switching node address.

12. The international roaming-capable mobile communication network system according to claim 8, wherein the service area notifying device notifies the server of the service area when the service request transmitted by the international roaming-capable mobile station is relayed to the server.

13. The international roaming-capable mobile communication network system according to claim 12, wherein the service area notifying device relay the service request to the server after adding a header describing the service area to a header area of the service request.

14. The international roaming-capable mobile communication network system according to claim 8, wherein the service area notifying device causes the server to control the form in which the service requested in the service request is provided in accordance with information about the service area determined by the service area determining device, by notifying the server of the information of the service area, wherein the information of the service area includes at least one of: a country of the service area and a carrier of the service area.

15. The international roaming-capable mobile station of claim 1, wherein the service includes at least one of: a song distribution service or an image distribution service.

16. The international roaming-capable mobile communication network system of claim 8, wherein the service includes at least one of: a song distribution service or an image distribution service.

17. The international roaming-capable mobile station of claim 1, wherein the service provided to the international roaming-capable mobile station in the form controlled by the service provision form controller includes at least one of: a song distribution service, a banking service or an image distribution service.

18. The international roaming-capable mobile communication network system of claim 8, wherein the service provided to the international roaming-capable mobile station in the form controlled by the service provision form controller includes at least one of: a song distribution service, a banking service or an image distribution service.

19. The international roaming-capable mobile station of claim 1, wherein the controlled form of the service includes allowing the service when content of the service is permitted in a first service area and denying the service when the content of the service is not permitted in a second service area different from the first service area.

20. The international roaming-capable mobile communication network system of claim 8, wherein the controlled form of the service includes allowing the service when content of the service is permitted in a first service area and denying the service when the content of the service is not permitted in a second service area different from the first service area.

* * * * *